US010567986B2

(12) United States Patent
Gupta et al.

(10) Patent No.: US 10,567,986 B2
(45) Date of Patent: Feb. 18, 2020

(54) BACK-OFF MECHANISMS FOR FAIR JOINT ACCESS OF UNLICENSED SIDELINK

(71) Applicant: QUALCOMM Incorporated, San Diego, CA (US)

(72) Inventors: Piyush Gupta, Bridgwater, NJ (US); Junyi Li, Chester, NJ (US); Chong Li, Weehawken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/449,346

(22) Filed: Mar. 3, 2017

(65) Prior Publication Data

US 2018/0070252 A1 Mar. 8, 2018

Related U.S. Application Data

(60) Provisional application No. 62/384,035, filed on Sep. 6, 2016.

(51) Int. Cl.
*H04W 24/08* (2009.01)
*H04W 48/16* (2009.01)
*H04W 56/00* (2009.01)

(52) U.S. Cl.
CPC ........... *H04W 24/08* (2013.01); *H04W 48/16* (2013.01); *H04W 56/001* (2013.01)

(58) Field of Classification Search
CPC ... H04W 24/08; H04W 48/16; H04W 56/001; H04W 56/002; H04W 74/0808; H04W 74/0891; H04W 76/14
See application file for complete search history.

(56) References Cited

U.S. PATENT DOCUMENTS

| 2003/0103521 A1* | 6/2003 | Raphaeli | H04B 3/542 370/445 |
| 2005/0058151 A1* | 3/2005 | Yeh | H04W 52/46 370/445 |

(Continued)

FOREIGN PATENT DOCUMENTS

WO WO-2016085295 A1 6/2016

OTHER PUBLICATIONS

Bianchi G., et al., "Performance Evaluation and Enhancement of the CSMA/CA MAC Protocol for 802.11 wireless LANs", IEEE International Symposium on Personal Indoor and Mobile Radio Communications, XX, XX, vol. 2, Oct. 15, 1996, XP002144465, pp. 392-396.

(Continued)

*Primary Examiner* — Khaled M Kassim
*Assistant Examiner* — Berhanu D Belete
(74) *Attorney, Agent, or Firm* — Loza & Loza, LLP

(57) ABSTRACT

Aspects of the disclosure relate to back-off mechanisms for fair joint access of an unlicensed sidelink channel. Each sidelink device may perform independent and asynchronous listen before talk (LBT) of the unlicensed sidelink channel with a respective back-off timer initialized with a back-off value selected to provide fair access to the unlicensed sidelink channel by both active sidelink devices and other devices utilizing the unlicensed sidelink channel. In some examples, the back-off value may be selected based on an estimated number of active sidelink devices. The estimated number of active sidelink devices may be determined, for example, by monitoring distributed handshake signaling on the unlicensed sidelink channel.

24 Claims, 22 Drawing Sheets

(56) References Cited

U.S. PATENT DOCUMENTS

| | | | | |
|---|---|---|---|---|
| 2006/0137009 | A1* | 6/2006 | Chesla | G06F 21/552 726/22 |
| 2008/0144493 | A1* | 6/2008 | Yeh | H04W 52/50 370/230 |
| 2009/0213740 | A1* | 8/2009 | Ganguly | H04L 41/0896 370/252 |
| 2011/0007656 | A1* | 1/2011 | He | H04L 12/413 370/252 |
| 2012/0300712 | A1* | 11/2012 | Hakola | H04W 74/008 370/329 |
| 2013/0094493 | A1* | 4/2013 | Batsuuri | H04W 74/0816 370/347 |
| 2013/0238919 | A1* | 9/2013 | Ponmudi | H04W 52/0216 713/323 |
| 2014/0036876 | A1* | 2/2014 | Li | H04W 4/70 370/336 |
| 2014/0078971 | A1* | 3/2014 | Bontu | H04W 8/005 370/329 |
| 2014/0086180 | A1* | 3/2014 | Lee | H04W 16/14 370/329 |
| 2014/0321438 | A1* | 10/2014 | Park | H04W 56/002 370/336 |
| 2015/0264646 | A1* | 9/2015 | Ponmudi | H04W 52/0216 713/323 |
| 2016/0007379 | A1* | 1/2016 | Seok | H04W 74/085 370/338 |
| 2016/0066349 | A1* | 3/2016 | Seok | H04W 24/02 370/338 |
| 2016/0105888 | A1* | 4/2016 | Seok | H04W 16/10 370/329 |
| 2017/0105211 | A1* | 4/2017 | Sivakumar | H04W 72/1289 |
| 2017/0201895 | A1* | 7/2017 | Hassan | H04W 24/02 |
| 2017/0202043 | A1* | 7/2017 | Seo | H04W 28/08 |
| 2017/0339530 | A1 | 11/2017 | Maaref | |

OTHER PUBLICATIONS

International Search Report and Written Opinion—PCT/US2017/048733—ISA/EPO—dated Nov. 7, 2017.

* cited by examiner

DL-Centric Slot

UL-Centric Slot

Sidelink-Centric Slot
(Broadcast)

Sidelink-Centric Slot
(Unicast)

BACK-OFF MECHANISMS FOR FAIR JOINT ACCESS OF UNLICENSED SIDELINK

PRIORITY CLAIM

This application claims priority to and the benefit of Provisional Patent Application No. 62/384,035 filed in the U.S. Patent and Trademark Office on Sep. 6, 2016, the entire content of which is incorporated herein by reference as if fully set forth below in its entirety and for all applicable purposes

TECHNICAL FIELD

The technology discussed below relates generally to wireless communication systems, and more particularly, to wireless communication using a sidelink channel. Embodiments can provide and enable techniques for utilizing unlicensed spectrum in sidelink communications.

INTRODUCTION

In many existing wireless communication systems, a cellular network is implemented by enabling wireless user equipment to communicate with one another by signaling with a nearby base station or cell. As a user equipment moves across the service area, handovers take place such that each user equipment maintains communication with one another via its respective best cell.

Another scheme for a wireless communication system is frequently referred to as a mesh or peer to peer (P2P) network, whereby wireless user equipment may signal one another directly, rather than via an intermediary base station or cell.

Somewhat in between these schemes is a system configured for sidelink signaling. With sidelink signaling, a wireless user equipment communicates in a cellular system, generally under the control of a base station. However, the wireless user equipment is further configured for sidelink signaling directly between user equipment without passing through the base station.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure relate to back-off mechanisms for fair joint access of an unlicensed sidelink channel. Each sidelink device may perform independent and asynchronous listen before talk (LBT) of the unlicensed sidelink channel with a respective back-off timer (BOT) initialized with a back-off time (value) selected to provide fair access to the unlicensed sidelink channel by both active sidelink devices and other devices utilizing the unlicensed sidelink channel (unlicensed devices). In some examples, the back-off value may be selected based on an estimated number of active sidelink devices. The estimated number of active sidelink devices may be determined, for example, by monitoring distributed handshake signaling on the unlicensed sidelink channel.

In one aspect of the disclosure, a method of sidelink wireless communication is disclosed. The method includes listening to a sidelink channel including an unlicensed spectrum, and estimating the number of sidelink devices that are actively accessing the sidelink channel within a given period of time to determine a current estimated number of active sidelink devices. When the sidelink channel is idle, the method further includes selecting a back-off value for a back-off timer based on at least the current estimated number of active sidelink devices, initializing the back-off timer with the back-off value, and upon expiration of the back-off timer, performing an access attempt of the sidelink channel by transmitting a joint access synchronization (JAS) signal including a duration of time that the sidelink channel may be accessed by the sidelink devices.

Another aspect of the disclosure provides an apparatus for sidelink wireless communication. The apparatus includes a processor, a transceiver communicatively coupled to the process, and a memory communicatively coupled to the processor. The processor is configured to listen to a sidelink channel including unlicensed spectrum, and estimate the number of sidelink devices that are actively accessing the sidelink channel within a given period of time to determine a current estimated number of active sidelink devices. The processor is further configured to select a back-off value for a back-off timer based on at least the current estimated number of active sidelink devices when the sidelink channel is idle, initialize the back-off timer with the back-off value, and upon expiration of the back-off timer, perform an access attempt of the sidelink channel by transmitting a joint access synchronization (JAS) signal including a duration of time that the sidelink channel may be accessed by the sidelink devices.

Another aspect of the disclosure provides an apparatus for sidelink wireless communication. The apparatus includes means for listening to a sidelink channel including unlicensed spectrum, and means for estimating the number of sidelink devices that are actively accessing the sidelink channel within a given period of time to determine a current estimated number of active sidelink devices. The apparatus further includes means for selecting a back-off value for a back-off timer based on at least the current estimated number of active sidelink devices when the sidelink channel is idle, means for initializing the back-off timer with the back-off value, and upon expiration of the back-off timer, means for performing an access attempt of the sidelink channel by transmitting a joint access synchronization (JAS) signal including a duration of time that the sidelink channel may be accessed by the sidelink devices.

Examples of additional aspects of the disclosure follow. In some aspects of the disclosure, the current estimated number of active sidelink device may be determined by monitoring distributed handshake signaling between the sidelink devices. In some examples, the distributed handshake signaling may include at least one of source transmit signals or destination receive signals transmitted by the sidelink devices.

In some aspects of the disclosure, the back-off value for the back-off timer may be selected by estimating a number of non-sidelink devices that are actively accessing the sidelink channel within the given period of time to determine a current estimated number of active non-sidelink devices, and selecting the back-off value for the back-off timer based on the current estimated number of active sidelink devices and the current estimated number of active non-sidelink devices. In some examples, a sidelink device may maintain an unlicensed device contention window that is representative of the current estimated number of active non-sidelink devices. The back-off value may then be selected by calculating a back-off contention window as a function of the unlicensed device contention widow and the current estimated number of active sidelink devices, and randomly selecting the back-off value from the back-off contention window. In some examples, a size of the unlicensed device contention window may be adapted based on whether the access attempt is successful. For example, the size of the unlicensed device contention window may be reduced when the access attempt is successful and increased when the access attempt is not successful.

In some aspects of the disclosure, the method further includes transmitting sidelink device information indicating the current estimated number of active sidelink devices within at least one of a source transmit signal or a destination receive signal. In some examples, the method may further include receiving other estimated numbers of sidelink devices from other sidelink devices within at least one of source transmit signals or destination receive signals, and updating the current estimated number of active sidelink devices based on the other estimated numbers of sidelink devices.

In some aspects of the disclosure, the method further includes setting an initial estimated number of sidelink devices, and adapting the initial estimated number of sidelink devices to produce the current estimated number of active sidelink devices based on distributed handshake signaling between the sidelink devices.

In some aspects of the disclosure, the back-off value may be selected such that a minimum back-off value of a set of back-off values utilized by the current estimated number of active sidelink devices is equal to an average back-off value utilized by non-sidelink devices that are actively accessing the sidelink channel. In some aspects of the disclosure, the method further includes updating the back-off value in response to detecting a collision on the sidelink channel.

In some aspects of the disclosure, the method further includes transmitting a source transmit signal (STS) from a first transmitting device, the STS indicating a first requested duration of time for the first transmitting device to utilize the sidelink channel to transmit a sidelink signal, receiving a destination receive signal (DRS) at the first transmitting device, the DRS indicating availability of the sidelink channel for the first requested duration of time, and transmitting the sidelink signal from the transmitting device over the sidelink channel. In some examples, the method further includes receiving an additional STS at the first transmitting device, the additional STS indicating an additional requested duration of time overlapping the first requested duration of time for an additional transmitting device to utilize the sidelink channel to transmit an additional sidelink signal. In some aspects of the disclosure, the method further includes freezing the back-off timer when the sidelink channel becomes busy.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
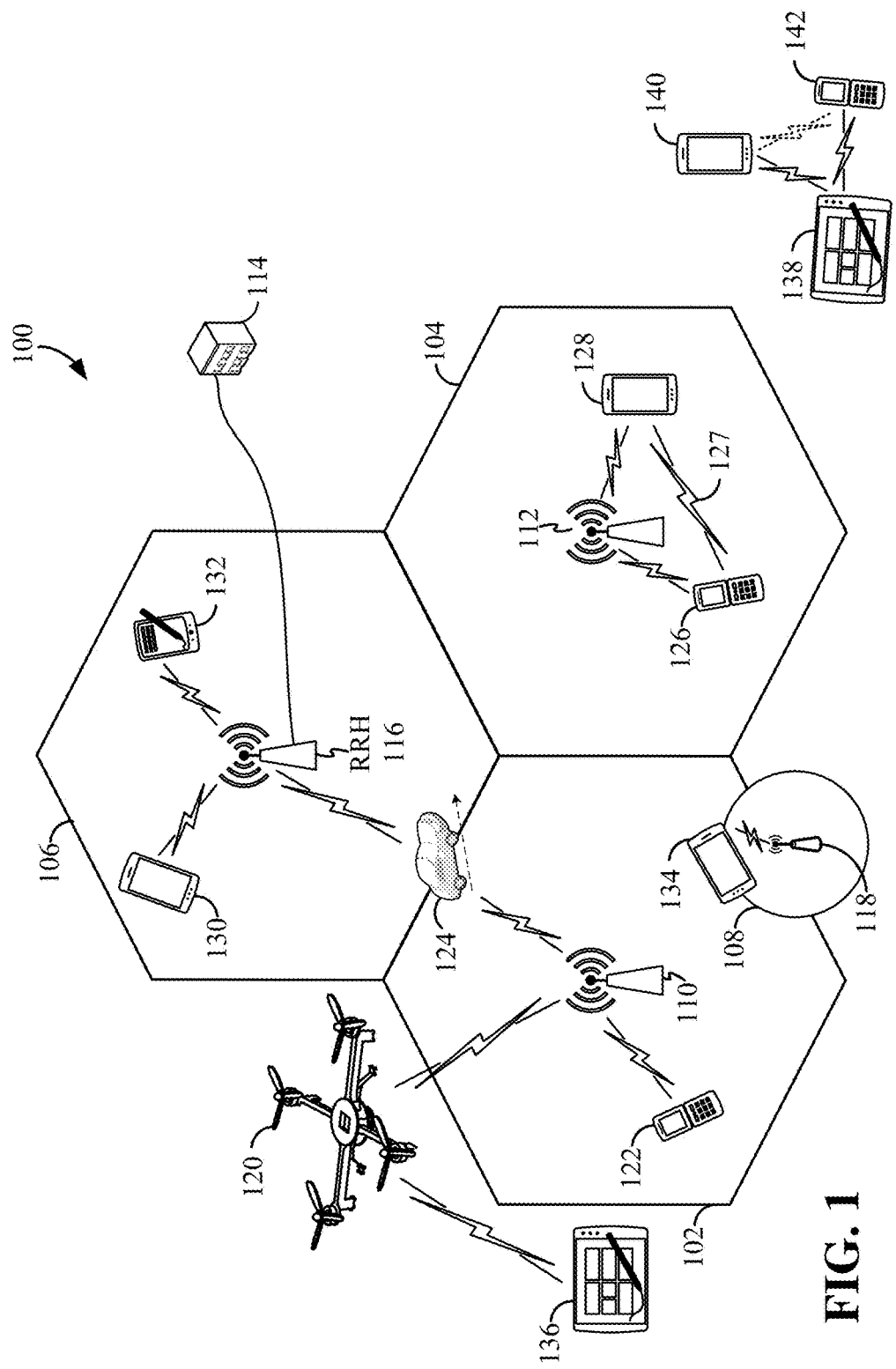
FIG. 1 is a diagram illustrating an example of an access network according to some aspects of the present disclosure.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a GNodeB or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an OFDM waveform, carries one resource element (RE) per subcarrier. A slot may carry 7 or 14 OFDM symbols. A subframe may refer to a duration of 1 ms. Multiple slots may be grouped together to form a single frame or radio frame. Of course, these definitions are not required, and any suitable scheme for organizing waveforms may be utilized, and various time divisions of the waveform may have any suitable duration.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), single-carrier frequency division multiple access (SC-FDMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), single-carrier frequency division multiplexing (SC-FDM) or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
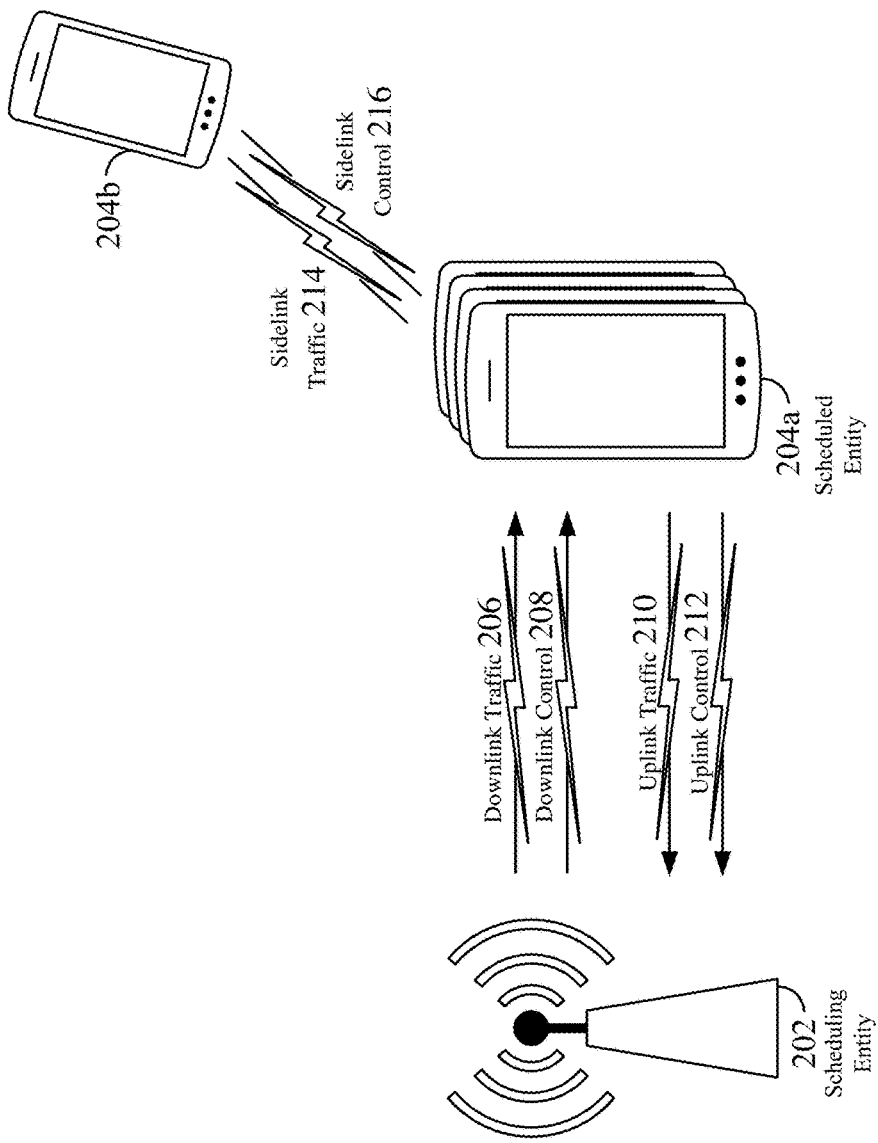
FIG. 2 is a diagram conceptually illustrating an example of a scheduling entity communicating with one or more scheduled entities according to some aspects of the present disclosure.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast user data traffic 206 to one or more scheduled entities 204 (the user data traffic may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling user data traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIB s)), may additionally be transmitted between the scheduling entity 202 and the scheduled entity 204. Transmissions of the control and user data traffic information may be organized by subdividing a carrier, in time, into suitable slots.

Furthermore, the scheduled entities 204 may transmit uplink control information 212 including one or more uplink control channels (e.g., the physical uplink control channel (PUCCH)) to the scheduling entity 202. Uplink control information (UCI) transmitted within the PUCCH may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into information blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, Walsh codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink user data traffic 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS (e.g., handshake) may enable different scheduled entities performing sidelink communications to negotiate the availability of the sidelink channel prior to communication of the sidelink user data traffic 214. The PSHICH may include HARQ acknowledgment information and/or a HARQ indicator from a destination device, so that the destination may acknowledge traffic received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
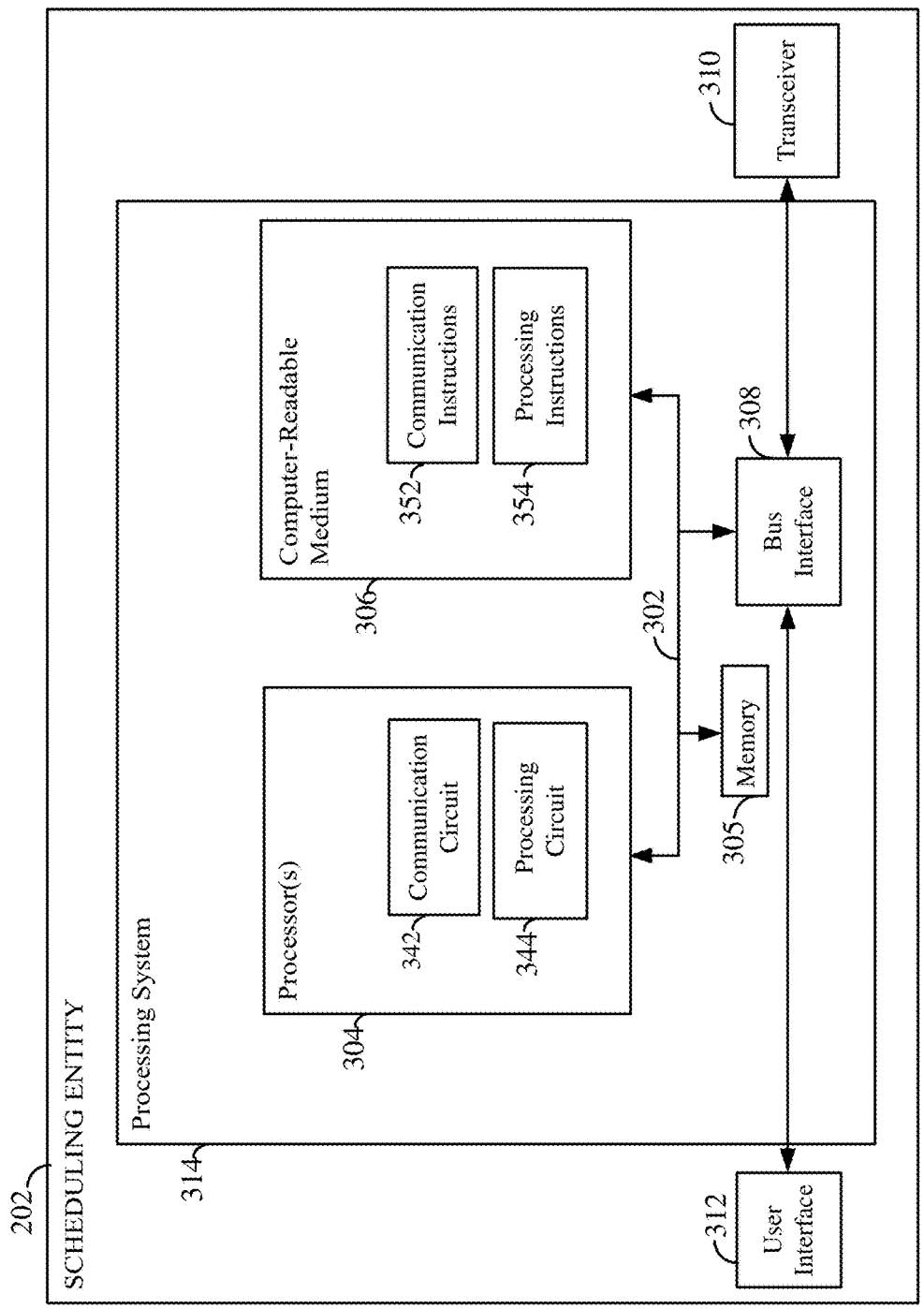
FIG. 3 is a diagram illustrating an example of a hardware implementation for a scheduling entity according to some aspects of the present disclosure.

FIG. 3 is a diagram 300 illustrating an example of a hardware implementation for scheduling entity 202 according to aspects of the present disclosure. Scheduling entity 202 may employ a processing system 314. Scheduling entity 202 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, scheduling entity 202 may be configured to perform any one or more of the functions described herein. That is, the processor 304, as utilized in scheduling entity 202, may be used or configured to implement any one or more of the processes described herein.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits. A bus interface 308 provides an interface between the bus 302 and a transceiver 310. The transceiver 310 provides a communication interface or a means for communicating with various other apparatuses over a transmission medium. Depending upon the nature of the apparatus, a user interface 312 (e.g., keypad, display, speaker, microphone, joystick) may also be provided.

At least one processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

In some aspects of the disclosure, the computer-readable medium 306 may include communication instructions 352. The communication instructions 352 may include instructions for performing various operations related to wireless communication (e.g., signal reception and/or signal transmission) as described herein. For example, the communication instructions 352 may include code for configuring the processing system 314 and communication interface 310 to communicate and control a plurality of scheduled entities using sidelink communication. In some aspects of the disclosure, the computer-readable medium 306 may include processing instructions 354. The processing instructions 354 may include instructions for performing various operations related to signal processing (e.g., processing a received signal and/or processing a signal for transmission) as described herein. In one example, the processing instructions 354 include code that may be executed by the processor 304 to control and schedule sidelink communication as described in FIGS. 7-22.

At least one processor 304 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 304 may include a communication circuit 342. The communication circuit 342 may include one or more hardware components that provide the physical structure that performs various processes related to wireless communication (e.g., signal reception and/or signal transmission) as described herein. For example, the communication circuit 342 may be configured to control and schedule sidelink communication among a plurality of scheduled entities. The communication circuit 342 may transmit or broadcast sidelink grants or control information to the scheduled entities using a downlink control channel (e.g., PDCCH) via the communication interface 310. In some aspects of the disclosure, the processor 304 may also include a processing circuit 343. The processing circuit 343 may include one or more hardware components that provide the physical structure that performs various processes related to signal processing (e.g., processing a received signal and/or processing a signal for transmission) as described herein.

The circuitry included in the processor 304 is provided as non-limiting examples. Other means for carrying out the described functions exists and is included within various aspects of the present disclosure. In some aspects of the disclosure, the computer-readable medium 306 may store computer-executable code comprising instructions configured to perform various processes described herein. The instructions included in the computer-readable medium 306 are provided as non-limiting examples. Other instructions configured to carry out the described functions exist and are included within various aspects of the present disclosure.

Figure 4:
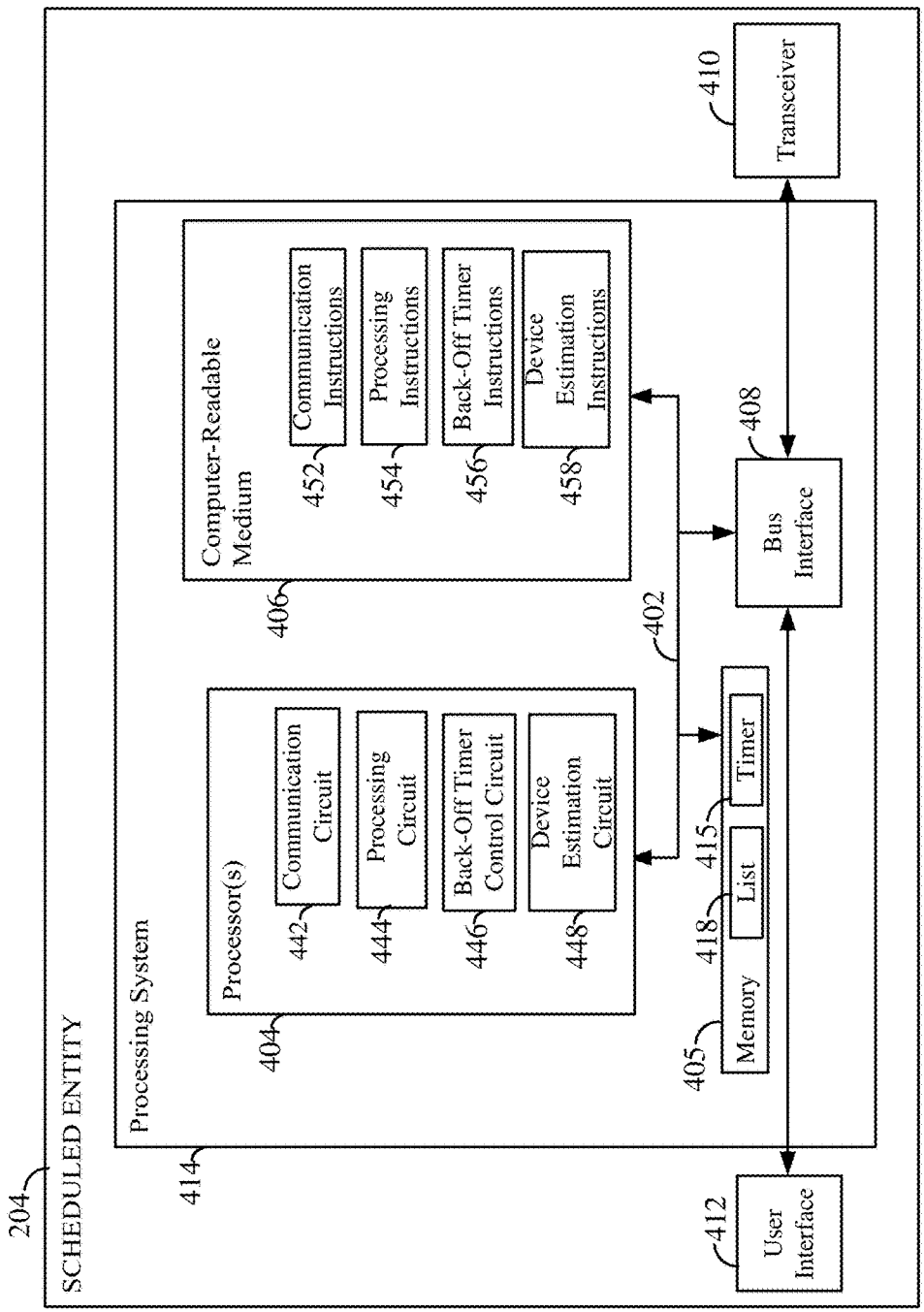
FIG. 4 is a diagram illustrating an example of a hardware implementation for a scheduled entity according to some aspects of the present disclosure.

FIG. 4 is a diagram 400 illustrating an example of a hardware implementation for a scheduled entity 204 according to aspects of the present disclosure. The scheduled entity 204 may employ a processing system 414. The scheduled entity 204 may be implemented with a processing system 414 that includes one or more processors 404. For example, the scheduled entity 204 may be a user equipment (UE) as illustrated in any one or more of FIGS. 1 and/or 2.

Examples of processors 404 include microprocessors, microcontrollers, DSPs, FPGAs, PLDs, state machines, gated logic, discrete hardware circuits, and other suitable hardware configured to perform the various functionality described throughout this disclosure. In various examples, scheduled entity 204 may be configured to perform any one or more of the functions described herein. That is, the processor 404, as utilized in scheduled entity 204, may be used or configured to implement any one or more of the processes described herein, for example, in FIGS. 7-22.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits. A bus interface 408 provides an interface between the bus 402 and a transceiver 410. The transceiver 410 provides a communication interface or a means for communicating with various other apparatuses over a transmission medium. Depending upon the nature of the apparatus, a user interface 412 (e.g., keypad, display, speaker, microphone, joystick) may also be provided.

At least one processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

In some aspects of the disclosure, the computer-readable medium 406 may include communication instructions 452. The communication instructions 452 may include instructions for performing various operations related to wireless communication (e.g., signal reception and/or signal transmission) as described herein. In some aspects of the disclosure, the communication instructions 452 may include code for configuring the scheduled entity to perform sidelink communication as described in relation to FIGS. 7-22. In some aspects of the disclosure, the computer-readable medium 406 may include processing instructions 454. The processing instructions 454 may include instructions for performing various operations related to signal processing (e.g., processing a received signal and/or processing a signal for transmission) as described herein. In some aspects of the disclosure, the processing instructions 454 may include code for configuring the scheduled entity to perform sidelink communication as described in relation to FIGS. 7-22.

In some aspects of the disclosure, the computer-readable medium 406 may include back-off timer instructions 456. The back-off timer instructions 456 may include instructions for controlling a back-off timer 415, which may be maintained, for example, in memory 405. For example, the back-off timer instructions 456 may include instructions for calculating a back-off value for the back-off timer 415 and/or for initializing, freezing, and/or canceling the back-off timer 415, as described in relation to FIGS. 9-20. In addition, the back-off timer instructions 456 may further include other suitable instructions for using and controlling the back-off timer 415. In some aspects of the disclosure, the computer-readable medium 406 may include device estimation instructions 458. The device estimation instructions 458 may include instructions for estimating a number of sidelink and/or non-sidelink devices actively accessing an unlicensed sidelink channel within a given period of time, as described in relation to FIGS. 12-21. The device estimation instructions 458 may further include instructions for maintaining a list 418 of sidelink and/or non-sidelink devices actively accessing the unlicensed sidelink channel within the given period of time within, for example, memory 406. The device estimation instructions 458 may further maintain an unlicensed device contention window and calculate a back-off contention window based on the unlicensed device contention window and the estimated number of active sidelink devices, as described in relation to FIGS. 14 and 20. The device estimation instructions 458 may further include instructions for storing the estimated number of sidelink and/or non-sidelink devices in the list 418.

At least one processor 404 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, at least one processor 404 may include a communication circuit 442. The communication circuit 442 may include one or more hardware components that provide the physical structure that performs various processes related to wireless communication (e.g., signal reception and/or signal transmission) as described herein. For example, the communication circuit 442 may be configured to perform sidelink communication as described in relation to FIGS. 7-22. In some aspects of the disclosure, the processor 404 may also include a processing circuit 444. The processing circuit 444 may include one or more hardware components that provide the physical structure that performs various processes related to signal processing (e.g., processing a received signal and/or processing a signal for transmission) as described herein. For example, the processing circuit 444 may be configured to perform sidelink communication as described in relation to FIGS. 7-22.

In some aspects of the disclosure, the processor 404 may also include a back-off timer control circuit 446. The back-off timer control circuit 446 may include one or more hardware components that provide the physical structure to perform various processes related to controlling the back-off timer 415. For example, the back-off timer control circuit 446 may be configured to calculate a back-off value for the back-off timer 415 and/or to initialize, freeze, cancel, and/or otherwise use the back-off timer 415 as described in relation to FIGS. 9-21. In some aspects of the disclosure, the processor 404 may further include a device estimation circuit 448. The device estimation circuit 448 may include one or more hardware components that provide the physical structure to perform various tasks related to estimating a number of sidelink and/or non-sidelink devices actively accessing an unlicensed sidelink channel within a given period of time, as described in relation to FIGS. 12-21. The device estimation circuit 448 may further include one or more hardware components that provide the physical structure to perform various tasks related to maintaining the list 418 of sidelink and/or non-sidelink devices actively accessing the unlicensed sidelink channel within the given period of time and/or storing the estimated number of sidelink and/or non-sidelink devices within the list 418. The device estimation circuit 448 may further include one or more hardware components that provide the physical structure to perform various tasks related to maintaining an unlicensed device contention window and calculating a back-off contention window based on the unlicensed device contention window and the estimated number of active sidelink devices, as described in relation to FIGS. 14 and 20.

The circuitry included in the processor 404 is provided as non-limiting examples. Other means for carrying out the described functions exists and is included within various aspects of the present disclosure. In some aspects of the disclosure, the computer-readable medium 406 may store computer-executable code comprising instructions configured to perform various processes described herein. The instructions included in the computer-readable medium 406 are provided as non-limiting examples. Other instructions configured to carry out the described functions exist and are included within various aspects of the present disclosure.

Figure 5:
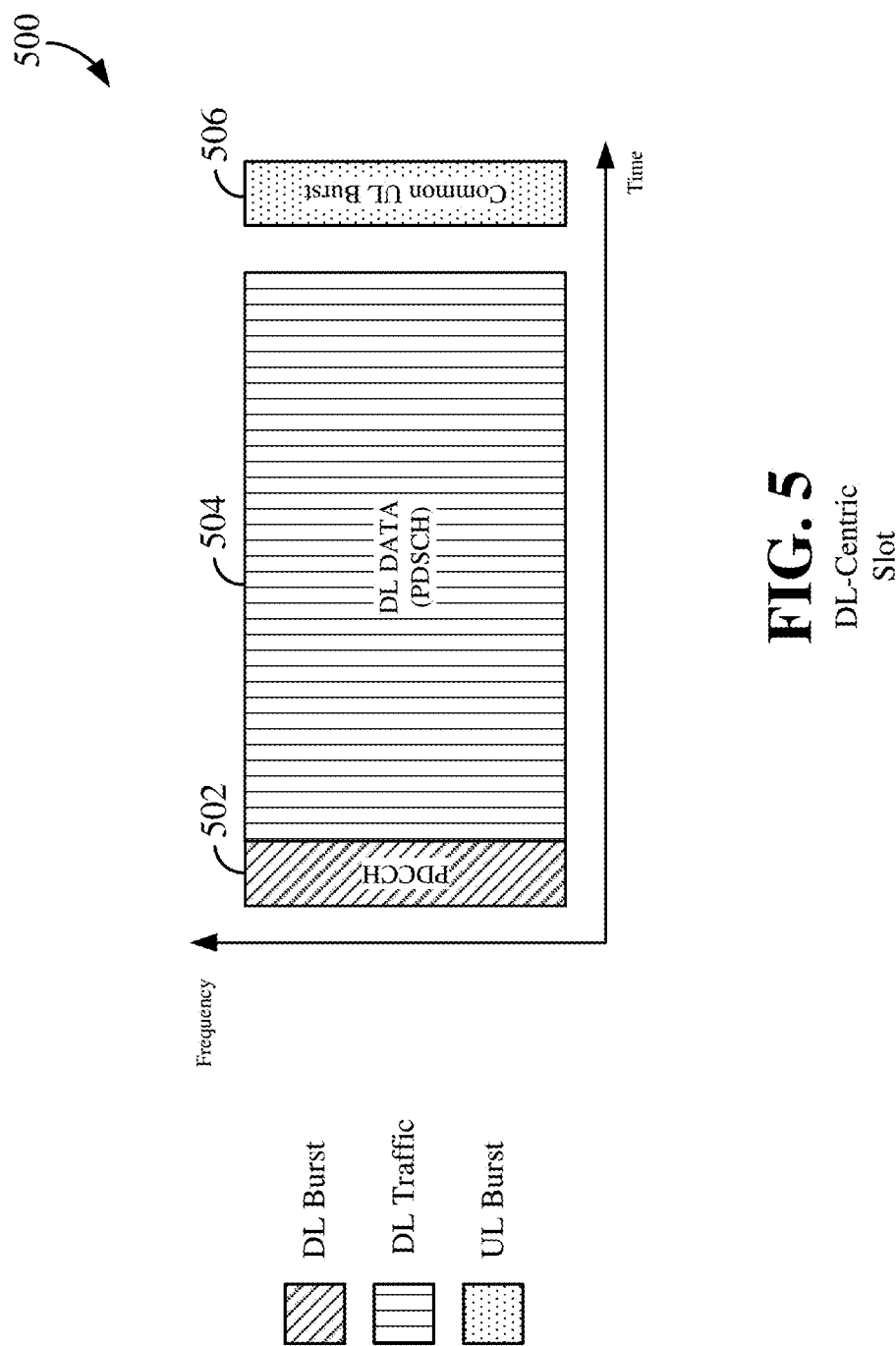
FIG. 5 is a diagram illustrating an example of a downlink (DL)-centric slot according to some aspects of the present disclosure.

According to various aspects of the disclosure, wireless communication may be implemented by dividing transmissions, in time, into frames, wherein each frame may be further divided into subframes or slots. These subframes or slots may be DL-centric, UL-centric, or sidelink-centric, as described below. For example, FIG. 5 is a diagram illustrating an example of a downlink (DL)-centric slot 500 according to some aspects of the disclosure. The DL-centric slot is referred to as a DL-centric slot because a majority (or, in some examples, a substantial portion) of the slot includes DL data. In the example shown in FIG. 5, time is illustrated along a horizontal axis, while frequency is illustrated along a vertical axis. The time-frequency resources of the DL-centric slot 500 may be divided into a DL burst 502, a DL traffic portion 504 and an UL burst 506.

The DL burst 502 may exist in the initial or beginning portion of the DL-centric slot. The DL burst 502 may include any suitable DL information in one or more channels. In some examples, the DL burst 502 may include various scheduling information and/or control information corresponding to various portions of the DL-centric slot. In some configurations, the DL burst 502 may be a physical DL control channel (PDCCH), as indicated in FIG. 5. The DL-centric slot may also include a DL traffic portion 504. The DL traffic portion 504 may sometimes be referred to as the payload of the DL-centric slot. The DL traffic portion 504 may include the communication resources utilized to communicate DL user data traffic from the scheduling entity 202 (e.g., eNB) to the scheduled entity 204 (e.g., UE). In some configurations, the DL traffic portion 504 may be a physical DL shared channel (PDSCH).

The UL burst 506 may include any suitable UL information in one or more channels. In some examples, the UL burst 506 may include feedback information corresponding to various other portions of the DL-centric slot. For example, the UL burst 506 may include feedback information corresponding to the control portion 502 and/or DL traffic portion 504. Non-limiting examples of feedback information may include an ACK signal, a NACK signal, a HARQ indicator, and/or various other suitable types of information. The UL burst 506 may include additional or alternative information, such as information pertaining to random access channel (RACH) procedures, scheduling requests (SRs), and various other suitable types of information.

As illustrated in FIG. 5, the end of the DL traffic portion 504 may be separated in time from the beginning of the UL burst 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric slot and alternative structures having similar features may exist without necessarily deviating from the aspects described herein.

Figure 6:
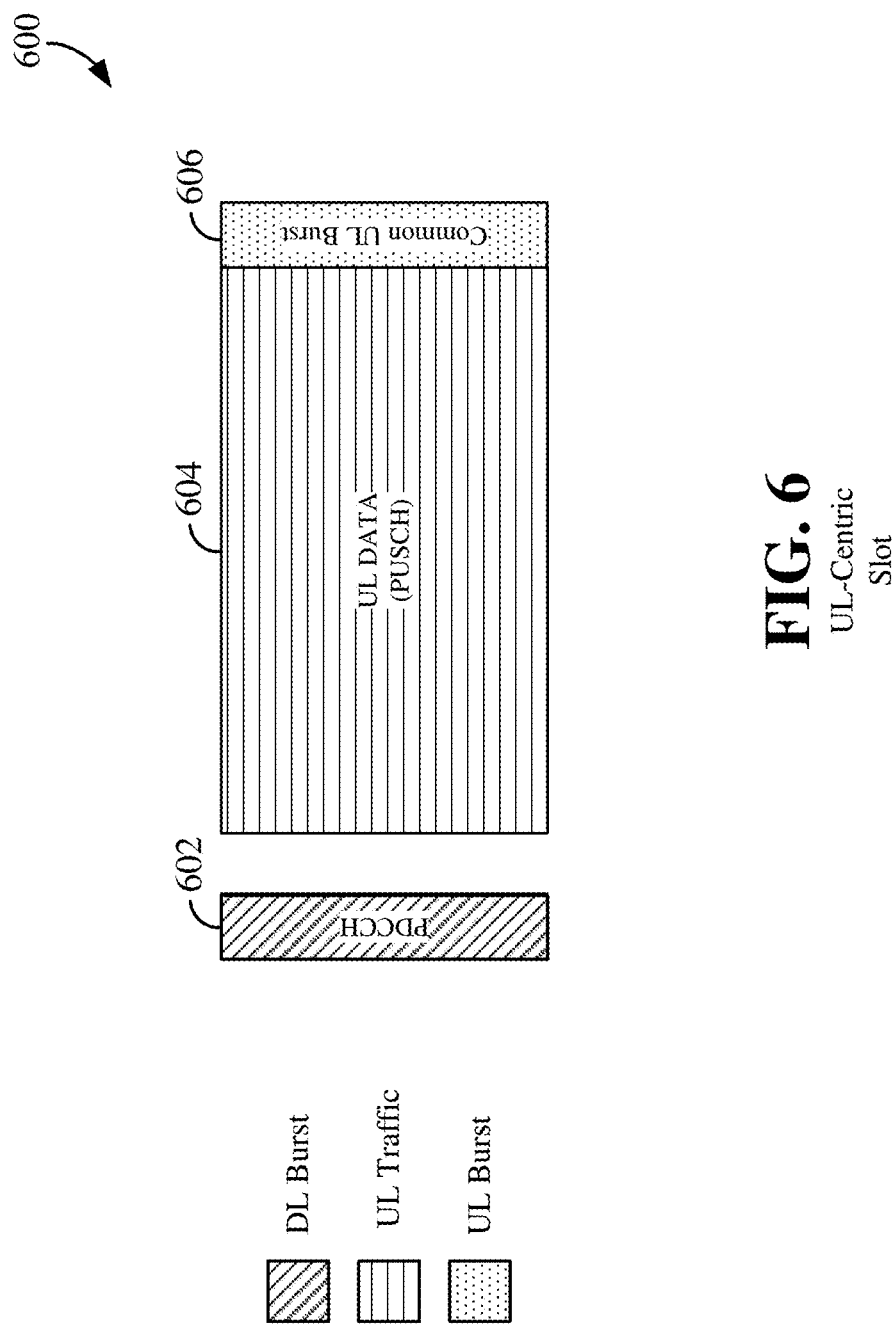
FIG. 6 is a diagram illustrating an example of an uplink (UL)-centric slot according to some aspects of the present disclosure.

FIG. 6 is a diagram showing an example of an uplink (UL)-centric slot 600 according to some aspects of the disclosure. The UL-centric slot is referred to as a UL-centric slot because a majority (or, in some examples, a substantial portion) of the slot includes UL data. In the example shown in FIG. 6, time is illustrated along a horizontal axis, while frequency is illustrated along a vertical axis. The time-frequency resources of the UL-centric slot 600 may be divided into a DL burst 602, an UL traffic portion 604 and an UL burst 606.

The DL burst 602 may exist in the initial or beginning portion of the UL-centric slot. The DL burst 602 in FIG. 6 may be similar to the DL burst 502 described above with reference to FIG. 5. The UL-centric slot may also include an UL traffic portion 604. The UL traffic portion 604 may sometimes be referred to as the payload of the UL-centric slot. The UL traffic portion 604 may include the communication resources utilized to communicate UL user data traffic from the scheduled entity 204 (e.g., UE) to the scheduling entity 202 (e.g., eNB). In some configurations, the UL traffic portion 604 may be a physical UL shared channel (PUSCH). As illustrated in FIG. 6, the end of the DL burst 602 may be separated in time from the beginning of the UL traffic portion 604. This time, separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)).

The UL burst 606 in FIG. 6 may be similar to the UL burst 506 described above with reference to FIG. 5. The UL burst 606 may additionally or alternatively include information pertaining to channel quality indicator (CQI), sounding reference signals (SRSs), and various other suitable types of information. One of ordinary skill in the art will understand that the foregoing is merely one example of an UL-centric slot, and alternative structures having similar features may exist without necessarily deviating from the aspects described herein.

In some circumstances, two or more scheduled entities 204 (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one scheduled entity 204 (e.g., $UE_1$) to another scheduled entity 204 (e.g., $UE_2$) without relaying that communication through the scheduling entity 202 (e.g., eNB), even though the scheduling entity 202 (e.g., eNB) may be utilized for scheduling and/or control purposes. In some examples, the sidelink signals may be communicated using licensed spectrum (unlike wireless local area networks, which typically use an unlicensed spectrum).

However, communication using sidelink signals may increase the relative likelihood of signal interference in certain circumstances. For example, without the aspects described in the present disclosure, interference may occur between the sidelink signals and the DL/UL control/scheduling information of nominal traffic. That is, the DL/UL control/scheduling information of nominal traffic may not be as well protected. As another example, without the aspects described in the present disclosure, interference may occur between sidelink signals originating from different scheduled entities 204 (e.g., UEs). That is, concurrently transmitted sidelink signals may collide and/or interfere with each other. Aspects of the present disclosure provide for an interference management scheme for concurrent sidelink signals and sidelink-centric slots that enable sidelink interference management.

Figure 7:
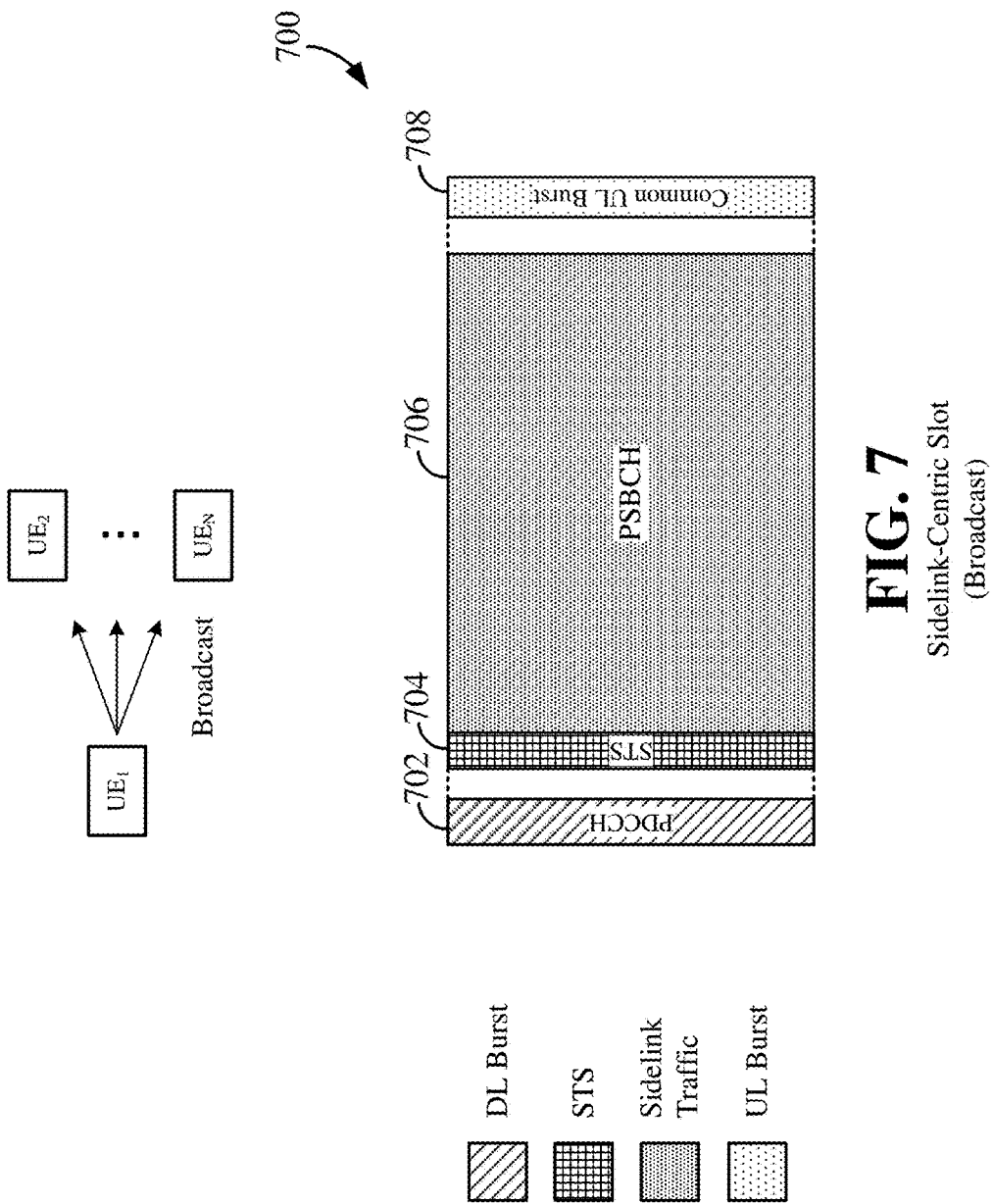
FIG. 7 is a diagram illustrating an example of a sidelink-centric slot according to some aspects of the present disclosure.

FIG. 7 is a diagram illustrating an example of a sidelink-centric slot 700 according to some aspects of the present disclosure. In some configurations, this sidelink-centric slot may be utilized for broadcast communication. A broadcast communication may refer to a point-to-multipoint transmission by one scheduled entity 204 (e.g., $UE_1$) to a set of one or more scheduled entities 204 (e.g., $UE_2$-$UE_N$). In this example, the sidelink-centric slot includes a DL burst 702, which may include a PDCCH. In some aspects, the DL burst 702 may be similar to the DL burst 502 described in greater detail above with reference to FIG. 5. Additionally or alternatively, the DL burst 702 may include grant information related to the sidelink signal or sidelink communication. Non-limiting examples of grant information may include generic grant information and link-specific grant information. Link-specific grant information may refer to information that enables a specific sidelink communication to occur between two particular scheduled entities 204 (e.g., UEs). In comparison, generic grant information may refer to information that generally enables sidelink communications to occur within a particular cell, without specifying a particular sidelink communication.

Notably, as illustrated in FIG. 7, the DL burst 702 may be included in the beginning or initial portion of the sidelink-centric slot. By including the DL burst 702 in the beginning or initial portion of the sidelink-centric slot, the likelihood of interfering with the DL bursts 502, 602 of DL-centric and UL-centric slots of nominal traffic can be reduced or minimized. In other words, because the DL-centric slot, the UL-centric slot, and the sidelink-centric slot have their DL control information communicated during a common portion of their respective slots, the likelihood of interference between the DL control information and the sidelink signals can be reduced or minimized. That is, the DL bursts 502, 602 of DL-centric and UL-centric slots (of nominal traffic) are relatively better protected.

The sidelink-centric slot 700 may also include a source transmit signal (STS) 704 portion (formerly referred to as, or similar to a, request-to-send (RTS) portion). The STS 704 portion may refer to a portion of the slot during which one scheduled entity 204 (e.g., a UE utilizing a sidelink signal) communicates a request signal (i.e., an STS) indicating a requested duration of time to keep a sidelink channel available for a sidelink signal. One of ordinary skill in the art will understand that the STS may include various additional or alternative information without necessarily deviating from the scope of the present disclosure. In some configurations, the STS may include a group destination identifier (ID). The group destination ID may correspond to a group of devices that are intended to receive the STS. In some configurations, the STS may indicate a duration of the sidelink transmission, and/or may include a reference signal (RS) to enable channel estimation and RX-yielding, a modulation and coding scheme (MCS) indicator, and/or various other information. In some examples, the STS RS may be transmitted at a higher (e.g., boosted) power level to provide additional protection of the broadcast. Further, the STS MCS indicator may be utilized to inform the receiving device of the MCS utilized for transmissions in the sidelink traffic portion 706. Here, the reference signal (RS) may take any suitable form or structure on the channel that may be useful for interference management (e.g., by creating a predictable amount of interference) and channel management at the receiver. In some configurations, the STS (or, in other examples, the DRS) may include a release flag, configured to explicitly signal that the transmitting device is releasing sidelink resources that may have previously been requested by the transmitting device, or in other words, sending an explicit release signal to indicate that a sidelink device is releasing a sidelink resource. Therefore, the release flag may be set in explicit sidelink signaling (e.g., STS/DRS) to indicate that a sidelink device is releasing a sidelink resource so that other users, which may have been backing off, can get back into trying to access or use the sidelink resources that were previously unavailable.

A first scheduled entity 204 (e.g., $UE_1$) may transmit an STS to one or more other scheduled entities 204 (e.g., $UE_2$, $UE_3$) to request that the other scheduled entities 204 (e.g., $UE_2$, $UE_3$) refrain from using the sidelink channel for the requested duration of time, thereby leaving the sidelink channel available for first scheduled entity 204 (e.g., $UE_1$). By transmitting the STS, the first scheduled entity 204 (e.g., $UE_1$) can effectively reserve the sidelink channel for a sidelink signal. This enables distributed scheduling and management of interference that might otherwise occur from another sidelink communication from other scheduled entities 204 (e.g., $UE_2$, $UE_3$). Put another way, because the other scheduled entities 204 (e.g., $UE_2$, $UE_3$) are informed that the first scheduled entity 204 (e.g., $UE_1$) will be transmitting for the requested period of time, the likelihood of interference between sidelink signals is reduced.

The sidelink-centric slot 700 may also include a sidelink traffic portion 706. The sidelink traffic portion 706 may sometimes be referred to as the payload or sidelink-burst of the sidelink-centric slot. In an example where the sidelink-centric slot is utilized for broadcast communications, the sidelink traffic portion 706 may carry a physical sidelink broadcast channel (PSBCH) (formerly a physical sidelink shared channel (PSSCH)), as indicated in FIG. 7. The sidelink traffic portion 706 may include the communication resources utilized to communicate sidelink user data traffic from one scheduled entity 204 (e.g., $UE_1$) to one or more other scheduled entities 204 (e.g., $UE_2$, $UE_3$).

According to a further aspect of the disclosure, a broadcast sidelink-centric slot may take on certain characteristics based on whether or not the broadcast is separated from other sidelink devices that utilize unicast sidelink-centric slots as described above. Here, a broadcast sidelink-centric slot utilized in the absence of unicast sidelink-centric slot transmissions may be referred to as an orthogonalized broadcast, while a broadcast sidelink-centric slot utilized in the presence of unicast sidelink-centric slot transmissions may be referred to as an in-band broadcast.

The sidelink traffic portion 706 may be configured utilizing a suitable MCS selected according to channel conditions. In one example, the receiving device may select an MCS based on a measurement of a receive power of a reference signal in the STS 704 portion, and a measurement of interference. For example, in low receive power and/or high interference scenarios, the receiving device may select a more robust MCS, e.g., utilizing a lower modulation order and/or a lower coding rate.

The sidelink-centric slot 700 may also include an UL burst 708. In some aspects, the UL burst 708 may be similar to the UL burst 506, 606 described above with reference to FIGS. 5-6. Notably, as illustrated in FIG. 7, the UL burst 708 may be included in the end portion of the sidelink-centric slot 700. By including the UL burst 708 in the end portion of the sidelink-centric slot, the likelihood of interfering with the UL bursts 506, 606 of DL-centric and UL-centric slots of nominal traffic is minimized or reduced. In other words, because the DL-centric slot, the UL-centric slot, and the sidelink-centric slot have their UL bursts 506, 606, 708 communicated during a similar portion of their respective slot, the likelihood of interference between those UL bursts 506, 606, 708 is minimized or reduced. That is, the UL bursts 506, 606 of DL-centric and UL-centric slots (of nominal traffic) are relatively better protected.

Figure 8:
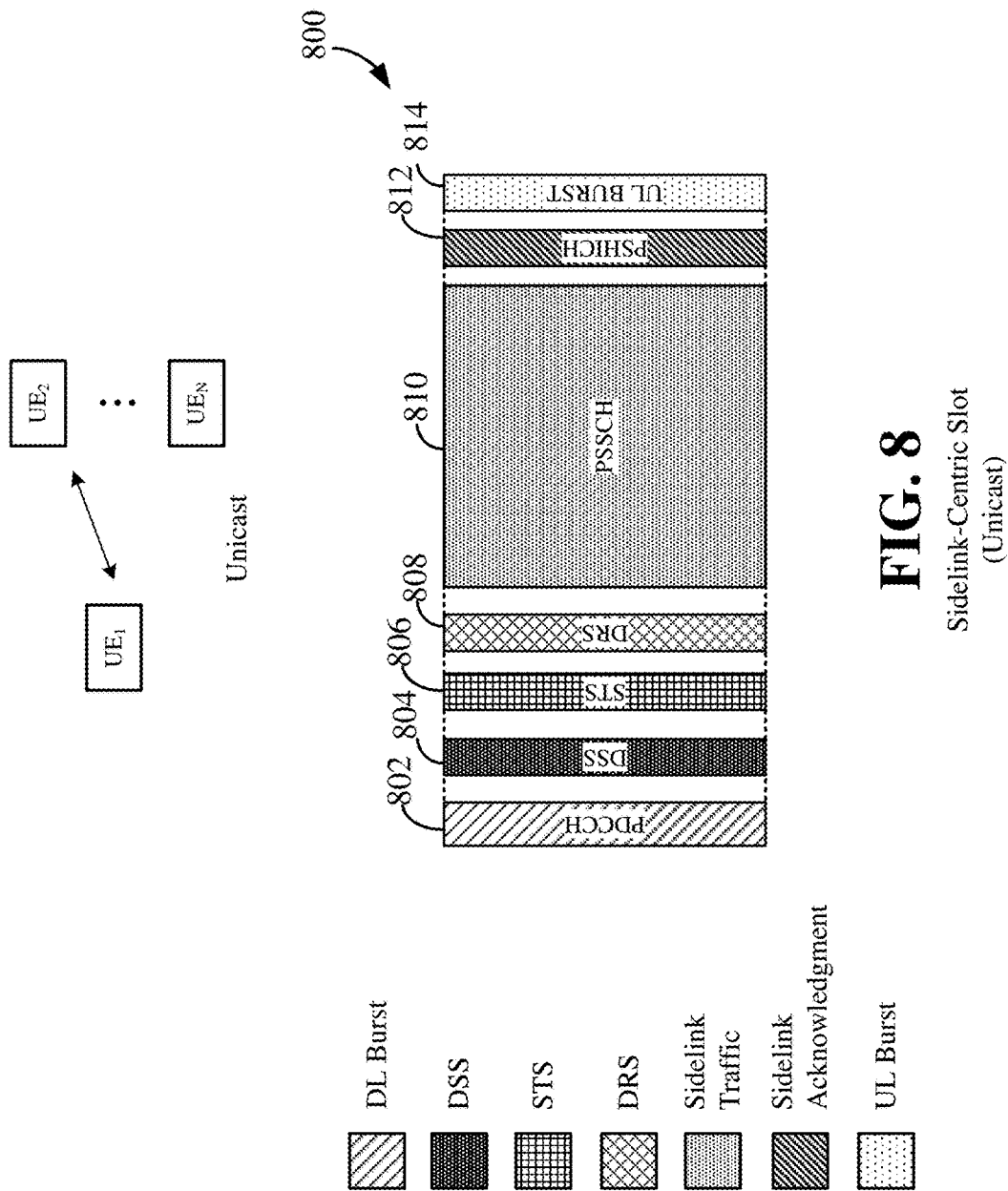
FIG. 8 is a diagram illustrating another example of a sidelink-centric slot according to some aspects of the present disclosure.

FIG. 8 is a diagram illustrating another example of a sidelink-centric slot 800 according to some aspects of the present disclosure. In some configurations, this sidelink-centric slot, or a slot having similar structure, may be utilized for a unicast communication. A unicast communication may refer to a point-to-point transmission by a scheduled entity 204 (e.g., $UE_1$) to a particular scheduled entity 204 (e.g., $UE_2$).

Figure 10:
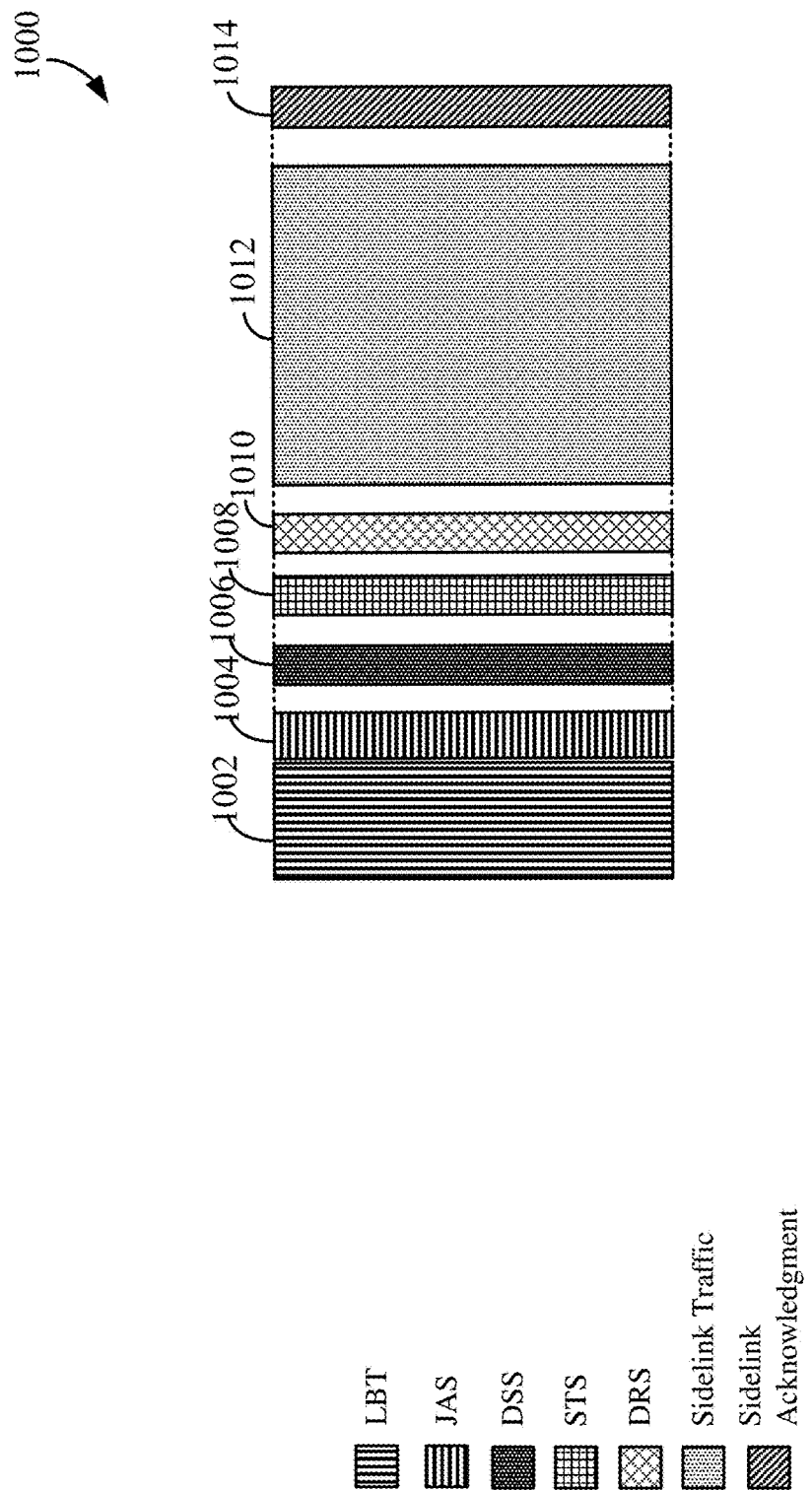
FIG. 10 is a diagram illustrating an example of an unlicensed sidelink-centric slot according to some embodiments.

In each of the sidelink-centric slots that follow, as described below, for a given device, certain fields or portions of the slot may correspond to transmissions from that device or reception at that device, depending on whether that given device is transmitting sidelink traffic or receiving sidelink traffic. As illustrated in each of FIGS. 8 and 10, a time gap (e.g., guard interval, guard period, etc.) between adjacent data portions, if any, may enable a device to transition from a listening/receiving state (e.g., during DSS 804 for a non-primary device) to a transmitting state (e.g., during STS 806 for a non-primary device); and/or to transition from a transmitting state (e.g., during STS 806 for a non-primary device) to a listening/receiving state (e.g., during DRS 808 for either a primary or non-primary transmitting device). The duration of such a time gap or guard interval may take any suitable value, and it should be understood that the illustrations in FIGS. 8 and 10 are not to scale with respect to time. Many such time gaps are shown in the various illustrations to represent some aspects of particular embodiments, but it should be understood that the illustrated time gaps may be wider or narrower than they appear, and in some examples, an illustrated time gap may not be utilized, while in other examples, the lack of a time gap might be replaced with a suitable time gap between regions of a slot. In some aspects of the disclosure, a particular slot may be structured with time gaps corresponding to TX-RX transitions as well as RX-TX transitions, in order that the same slot structure may accommodate the operation of a given device both when that device is transmitting sidelink traffic, and when that device is receiving sidelink traffic.

In the example illustrated in FIG. 8, the sidelink-centric slot includes a DL burst 802, which may include a physical downlink control channel (PDCCH). In some aspects, the DL burst 802 may be configured the same as or similar to the DL burst 502 (e.g., PDCCH) described in greater detail above with reference to FIG. 5. Additionally or alternatively, the DL burst 802 may include grant information related to the sidelink signal or sidelink communication. Non-limiting examples of grant information may include generic grant information and link-specific grant information. Link-specific grant information may refer to information that enables a specific sidelink communication to occur between two particular scheduled entities 204 (e.g., UEs). In comparison, generic grant information may refer to information that generally enables sidelink communications to occur within a particular cell, without specifying a particular sidelink communication.

Notably, as illustrated in FIG. 8, the DL burst 802 may be included in the beginning or initial portion of the sidelink-centric slot 800. By including the DL burst 802 in the beginning or initial portion of the sidelink-centric slot 800, the likelihood of interfering with the DL bursts 502, 602 of DL-centric and UL-centric slots of nominal traffic is minimized. In other words, because the DL-centric slot 500, the UL-centric slot 600, and the sidelink-centric slot 800 have their DL control information communicated during a common portion of their respective slots, the likelihood of interference between the DL control information and the sidelink signals is minimized. That is, the DL bursts 502, 602 of DL-centric and UL-centric slots (of nominal traffic) are relatively better protected.

The sidelink-centric slot 800 may further include a primary request signal such as a direction selection signal (DSS) 804, and a secondary request signal such as a source transmit signal (STS) 806. In various examples, the content of the DSS and the STS may take different formats. As one example, the DSS 804 may be utilized for direction selection and the STS 806 may be utilized as a request signal. Here, direction selection refers to the selection whether a primary sidelink device transmits a request signal in the STS, or whether a primary sidelink device receives a request signal (i.e., a non-primary or secondary sidelink device transmits a request signal in the STS). In this example, the DSS may include a destination ID (e.g., corresponding to a non-primary or secondary sidelink device) and a direction indication. In this manner, a listening sidelink device that receives the DSS transmission and is not the device corresponding to the destination ID need not necessarily be active and monitoring for the STS transmission. In this example, the STS may include an indication of a requested duration of time to reserve a sidelink channel for sidelink data. Accordingly, with the STS/DSS portions of the sidelink-centric slot 800, a request for reservation of the sidelink channel in a desired direction between a primary and a non-primary sidelink device may be established.

In another example, content of the DSS 804 and the STS 806 may be substantially similar to one another, although the DSS 804 may be utilized by a primary sidelink device and the STS 806 may be utilized by a secondary sidelink device. The DSS and/or STS may be utilized by a scheduled entity 204 (e.g., UE) as a request signal to indicate a requested duration of time to keep a sidelink channel available for a sidelink signal. One of ordinary skill in the art will understand that the DSS and/or STS may include various additional or alternative information without necessarily deviating from the scope of the present disclosure. In some configurations, the DSS and/or STS may include a destination identifier (ID). The destination ID may correspond to a specific apparatus intended to receive the STS/DSS (e.g., UE2). In some configurations, the DSS and/or STS may indicate a duration of the sidelink transmission, and/or may include a reference signal to enable channel estimation and RX-yielding, a modulation and coding scheme (MCS) indicator, and/or various other information. Here, the MCS indicator may be utilized to inform the receiving device of the MCS utilized for transmissions in the sidelink traffic portion.

A primary device may transmit a primary request signal (e.g., a DSS) during a primary request portion of a slot (e.g., DSS 804), and a non-primary device (e.g., a secondary device) may transmit a secondary request signal (e.g., an STS) during a secondary request portion of the slot (e.g., STS 806 portion). A primary device may refer to a device (e.g., a UE or scheduled entity 204) that has priority access to the sidelink channel. During an association phase, one device may be selected as the primary device and another device may be selected as the non-primary (e.g., secondary) device. In some configurations, the primary device may be a relay device that relays a signal from a non-relay device to another device, such as a scheduling entity 202 (e.g., base station). The relay device may experience relatively less path loss (when communicating with the scheduling entity 202 (e.g., base station)) relative to the path loss experienced by the non-relay device.

During the DSS 804 portion, the primary device transmits a DSS, and the non-primary device listens for the DSS from a primary device. On the one hand, if the non-primary device detects a DSS during the DSS 804 portion, then the non-primary device will not transmit an STS during the STS 806 portion. On the other hand, if the non-primary device does not detect a DSS during the DSS 804 portion, then the non-primary device may transmit an STS during the STS 806 portion.

If the sidelink channel is available for the requested duration of time, an apparatus identified or addressed by the destination ID in the STS/DSS, which receives the STS/DSS, may communicate a confirmation signal, such as a destination receive signal (DRS), during the DRS 808 portion. The DRS may indicate availability of the sidelink channel for the requested duration of time. The DRS may additionally or alternatively include other information, such as a source ID, a duration of the transmission, a signal to interference plus noise ratio (SINR) (e.g., of the received RS from the source device), an RS to enable TX-yielding, CQI information, and/or various other suitable types of information. The exchange of STS/DSS and DRS enable the scheduled entities 204 (e.g., UEs) performing the sidelink communications to negotiate the availability of the sidelink channel prior to the communication of the sidelink signal, thereby minimizing the likelihood of interfering sidelink signals. In other words, without the STS/DSS and DRS, two or more scheduled entities 204 (e.g., UEs) might concurrently transmit sidelink signals using the same resources of the sidelink traffic portion 910, thereby causing a collision and resulting in avoidable retransmissions.

The sidelink-centric slot may also include a sidelink traffic portion 810. The sidelink traffic portion 810 may sometimes be referred to as the payload or sidelink-burst of the sidelink-centric slot. In an example where the sidelink-centric slot is utilized for unicast transmissions, the sidelink traffic portion 810 may carry a physical sidelink shared channel (PSSCH). The sidelink traffic portion 810 may include the communication resources utilized to communicate sidelink user data traffic from one scheduled entity 204 (e.g., $UE_1$) to a second scheduled entity 204 (e.g., $UE_2$). In some configurations, the MCS of the sidelink signal communicated in the sidelink traffic portion 810 may be selected based on the CQI feedback included in the DRS 808.

The sidelink-centric slot may also include a sidelink acknowledgment portion 912. In some aspects, the sidelink acknowledgment portion 812 may carry a physical sidelink HARQ indicator channel (PSHICH). After communicating the sidelink signal in the sidelink traffic portion 810, acknowledgment information may be communicated between the scheduled entities 204 (e.g., UEs) utilizing the sidelink acknowledgment portion 812. Non-limiting examples of such acknowledgment information may include an ACK signal, a NACK signal, a HARQ indicator, and/or various other suitable types of acknowledgment information. For example, after receiving and successfully decoding a sidelink signal from $UE_1$ in the sidelink traffic portion 810, $UE_2$ may transmit an ACK signal to the $UE_1$ in the sidelink acknowledgment portion 812 of the sidelink-centric slot.

The sidelink-centric slot may also include an UL burst 814. In some aspects, the UL burst 814 may be configured the same as or similar to the UL burst 506, 606 described above with reference to FIGS. 5-6. Notably, as illustrated in the example of FIG. 8, the UL burst 814 may be included in the end portion of the sidelink-centric slot. By including the UL burst 814 in the end portion of the sidelink-centric slot, the likelihood of interfering with the UL burst 506, 606 of DL-centric and UL-centric slots of nominal traffic is minimized. In other words, because the DL-centric slot, the UL-centric slot, and the sidelink-centric slot have their UL burst 506, 606, 814 communicated during the same or similar portion of their respective slot, the likelihood of interference between those UL bursts 506, 606, 814 is reduced. That is, the UL bursts 506, 606 of DL-centric and UL-centric slots (of nominal traffic) are relatively better protected.

The above examples of sidelink-centric subframes or slots utilize licensed spectrum for wireless communication. However, in various aspects of the present disclosure, sidelink signals may also be transmitted over unlicensed spectrum. In some examples, access to unlicensed spectrum may involve sharing the unlicensed spectrum with traditional types of unlicensed wireless communication, such as Wi-Fi, Bluetooth, LTE-U (Long Term Evolution (LTE) in unlicensed spectrum), LAA (Licensed-Assisted Access), or MuLTEfire. To provide fair sharing of the unlicensed spectrum between unlicensed devices (e.g., both sidelink devices and other types of unlicensed devices), sidelink wireless communication over unlicensed spectrum may utilize "Listen Before Talk" (LBT). LBT is a contention-based protocol used in wireless communication that allows several wireless devices to utilize the same spectrum or channel. For example, before a device can transmit a signal over the shared channel, the device may first check (listen) to determine that the channel is not currently in use. If the channel is not being used (e.g., the channel is idle or silent), the device can transmit the signal over the shared channel.

LBT may also utilize a back-off procedure in which a device having traffic to send generates a random back-off time after detecting the unlicensed channel is idle, and then decrements a back-off timer initialized with the random back-off time until the unlicensed channel becomes busy or the timer reaches zero. If the unlicensed channel becomes busy prior to expiration of the back-off timer, the device may freeze the timer. When the back-off timer expires (or decrements to zero), the device may transmit the traffic.

In addition, to enable joint access of the unlicensed spectrum for multiple sidelinks, where each sidelink corresponds to a unicast link (or wireless connection) between two sidelink devices, sidelink transmissions may further be synchronized among the different concurrently active sidelinks. In other unlicensed networks, such as LTE-U, LAA and MuLTEfire, synchronization is typically achieved via control signaling either over a licensed spectrum or over a backhaul connection. However, since each unicast sidelink is between two wireless sidelink devices, back-haul signaling is not available. Moreover, control signaling over licensed spectrum may not be available or practical in many situations.

Therefore, in accordance with various aspects of the present disclosure, each sidelink device with traffic to send may perform independent and asynchronous LBT using a random or calculated back-off timer value selected to promote fair access to the unlicensed channel. The first sidelink device to complete the back-off procedure may then transmit a joint access synchronization (JAS) signal to synchronize access to the unlicensed channel among the various sidelink devices.

Figure 9:
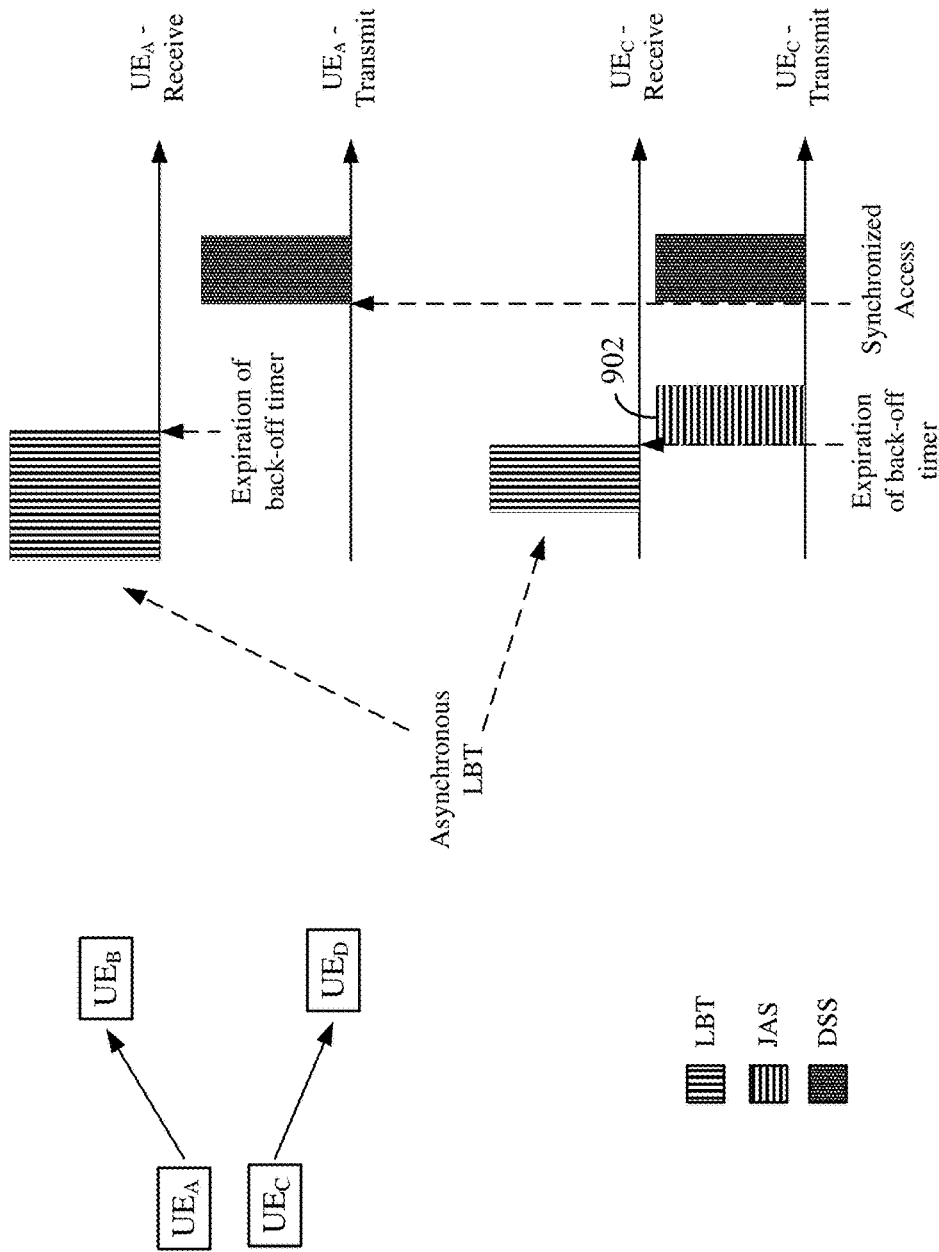
FIG. 9 is a diagram illustrating synchronized access in unlicensed sidelink wireless communication according to some embodiments.

FIG. 9 is a diagram illustrating synchronized access in unlicensed sidelink wireless communication according to some embodiments. In the example shown in FIG. 12, two sidelinks (A->B and C->D) share an unlicensed channel (spectrum). Sidelink A->B corresponds to a sidelink between $UE_A$ and $UE_B$, while sidelink C->D corresponds to a sidelink between $UE_C$ and $UE_D$. If both $UE_A$ and $UE_C$ have traffic to transmit, each may perform independent and asynchronous LBT. For example, $UE_A$ may have traffic to transmit before $UE_C$, and therefore, $UE_A$ may initiate the LBT procedure prior to $UE_C$. $UE_A$ and $UE_C$ may each listen to the unlicensed channel (e.g., turn on their respective receivers to monitor the carrier for any over-the-air transmissions by other devices), and if the channel is idle, generate a respective back-off time (value) and initialize a respective back-off timer with the generated back-off value. In the example shown in FIG. 9, the back-off value generated by $UE_C$ is less than the back-off value generated by $UE_A$. Thus, the back-off timer of $UE_C$ expires before the back-off timer of $UE_A$.

Upon expiration of the back-off timer, $UE_C$ generates and transmits the JAS signal 902 over the unlicensed channel to synchronize access to the unlicensed channel among sidelink devices (e.g., $UE_A$ and $UE_C$). The JAS signal 902 may include, for example, network allocation vector (NAV) information that indicates a duration of time that the sidelink channel may be accessed by sidelink devices. The NAV information effectively reserves the unlicensed channel for sidelink communication for the indicated duration of time. In some examples, the duration of time may correspond to an amount of traffic that $UE_C$ has to send. For example, $UE_C$ may calculate the duration of time based on a transmit buffer status (e.g., fullness of the transmit buffer). In some examples, the JAS signal may be compatible with other unlicensed wireless technology, such as Wi-Fi, Bluetooth, LTE-U, LAA, and/or MuLTEfire, to enable other unlicensed devices to determine the duration of time that the unlicensed channel may be busy. In other examples, $UE_C$ may transmit one or more separate compatible signals including the NAV information.

After transmission of the JAS signal 902, synchronized access to the unlicensed channel across various active sidelinks may be achieved through distributed handshake signaling. In various aspects of the present disclosure, the distributed handshake signaling may be implemented using an unlicensed sidelink-centric slot structure including a DSS, STS and DRS exchange.

FIG. 10 is a diagram 1000 illustrating an example of an unlicensed sidelink-centric slot according to some embodiments. The example of the unlicensed sidelink-centric slot illustrated in FIG. 10 includes an LBT portion 1002, a JAS portion 1004, a DSS portion 1006, an STS portion 1008, a DRS portion 1010, a sidelink traffic portion 1012 and a sidelink acknowledgment portion 1014. Thus, the unlicensed sidelink-centric slot is similar to the licensed sidelink-centric slot shown in FIG. 8 with the exception that the unlicensed sidelink-centric slot includes the LBT 1002 and JAS 1004 portions and does not include an UL burst or control portion.

Within the LBT portion 1002, as described above, one or more unlicensed sidelink devices perform LBT with back-off timers initialized to respective back-off values. If the unlicensed channel remains idle, at the expiration of a back-off timer of one of the unlicensed sidelink devices (e.g., $UE_C$ shown in FIG. 9), the unlicensed sidelink device generates and transmits the JAS signal within the JAS portion 1004. The JAS portion 1004 may include, for example, NAV information indicating a duration of time that unlicensed sidelink devices may access the unlicensed channel.

A time gap (e.g., a guard interval, etc.) between the JAS portion 1004 and the DSS portion 1006 allows a primary device to transition from a listening/receiving state to a transmitting state (during DSS). If one or more non-primary devices do not detect a DSS signal during the DSS portion 1006, then the non-primary devices may transmit respective STSs during the STS portion 1008. As long as the interference between different sidelinks remains within acceptable levels (e.g., the SINR experienced at a sidelink receiving device is greater than a threshold when two or more transmitting sidelink devices concurrently transmit STSs during the STS portion 1008), each sidelink receiving device may transmit a respective DRS during DRS portion 1010 to enable concurrent transmissions of multiple sidelink signals over the unlicensed channel. Additional description regarding the DSS 1006, STS 1008 and DRS 1010 portions are provided above (e.g., with reference to FIG. 8) and therefore will not be repeated to avoid redundancy.

As also described in greater detail above, the sidelink signal(s) may be communicated in the sidelink traffic portion 1012 of the unlicensed sidelink-centric slot. After communicating the sidelink signal in the sidelink traffic portion 1012, acknowledgment information may be communicated (e.g., from $UE_B$ and $UE_D$ to $UE_A$ and $UE_C$, respectively, shown in FIG. 10) in the sidelink acknowledgment portion 1014. In some configurations, the sidelink acknowledgment portion 1014 may be a physical sidelink HARQ indicator channel (PSHICH).

Figure 11:
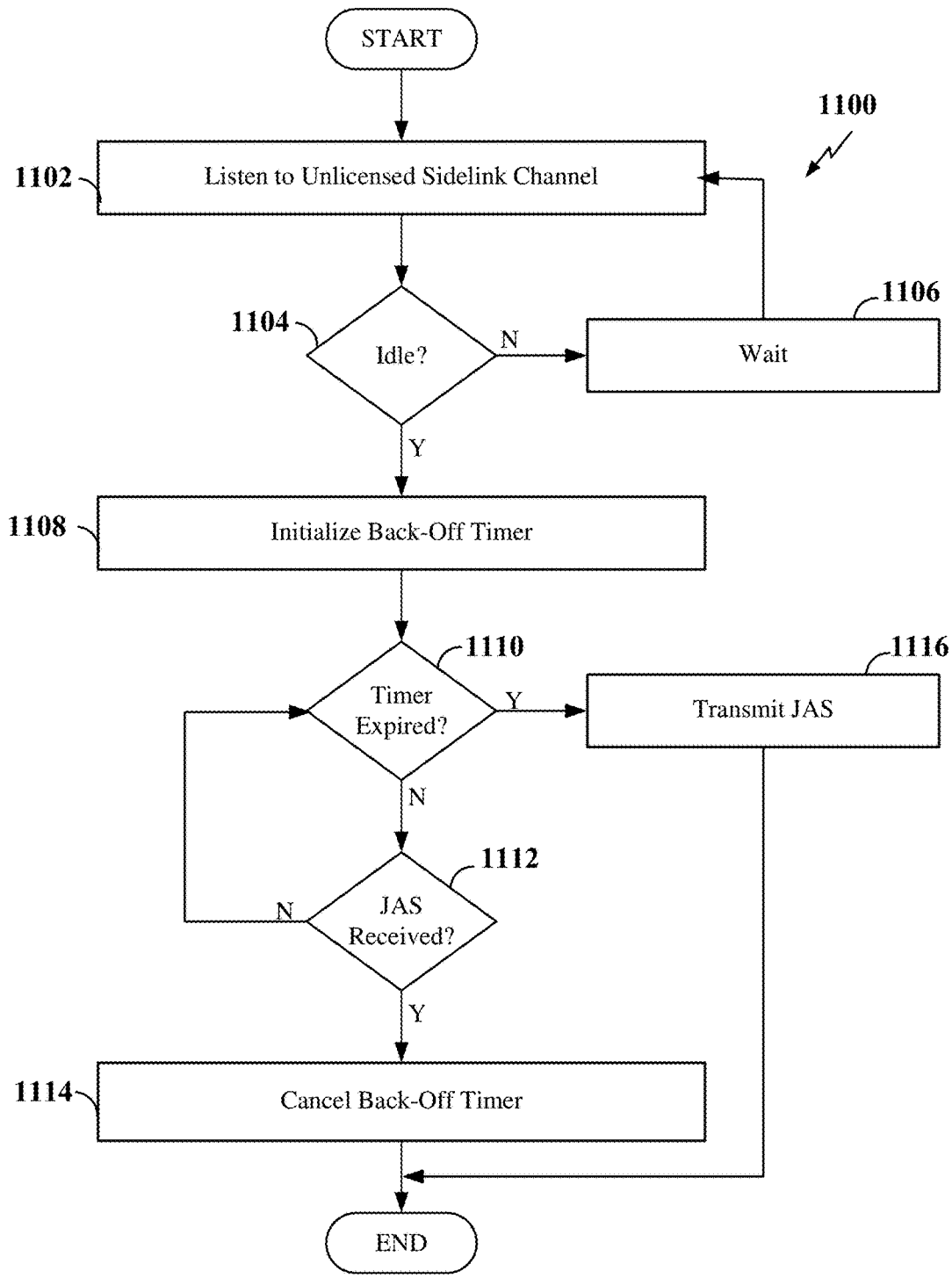
FIG. 11 is a flow chart illustrating a process for unlicensed sidelink communication according to some embodiments.

FIG. 11 is a flow chart illustrating a process 1100 for unlicensed sidelink communication in accordance with some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting device and a receiving device. It will be understood that either device may the user equipment 126 and/or 128 illustrated in FIG. 1; and/or the scheduled entity 204 illustrated in FIGS. 2 and 4. In some examples, the process 1100 may be carried out by any suitable apparatus or means for carrying out the functions or algorithm described below.

At block 1102, a transmitting sidelink device with traffic to send may listen to a sidelink channel including unlicensed spectrum (e.g., an unlicensed sidelink channel). At block 1104, the transmitting sidelink device may determine whether the unlicensed sidelink channel is idle. For example, the transmitting sidelink device may determine whether traffic is currently being transmitted over the unlicensed sidelink channel. If the unlicensed sidelink channel is busy (N branch of 1104), at block 1106, the transmitting sidelink device waits until the channel is idle. For example, the transceiver 410 and communication circuit 442 shown and described above in connection with FIG. 4 may listen to the unlicensed sidelink channel to determine whether the unlicensed sidelink channel is idle.

If the unlicensed sidelink channel is idle (Y branch of 1104), at block 1108, the transmitting sidelink device generates a back-off value and initializes a back-off timer with the back-off value. In some examples, the back-off value may be randomly selected from a set of possible back-off values (e.g., values within a contention window). In other examples, the back-off value may be generated based on the type of traffic (e.g., priority associated with traffic) to be sent. In still other examples, the back-off value may be generated to provide fair access to the unlicensed sidelink channel by different types of unlicensed devices (e.g., unlicensed sidelink devices and other unlicensed devices, such as Wi-Fi, Bluetooth, etc.). For example, the back-off timer control circuit 446 shown and described above in connection with FIG. 4 may calculate the back-off value and initialize the back-off timer with the back-off value.

Although FIG. 11 illustrates block 1108 occurring after block 1104 and when the unlicensed sidelink channel is idle, in another example, block 1108 may be performed before block 1104. In this example, if the unlicensed sidelink channel is busy, the transmitting sidelink device may freeze the back-off timer until the channel becomes idle.

At block 1110, the transmitting sidelink device may determine whether the back-off timer has expired. For example, the back-off timer control circuit 446 shown and described above in connection with FIG. 4 may determine whether the back-off timer has expired. If the back-off timer has not expired (N branch of 1110), at block 1112, the transmitting sidelink device may determine whether a JAS signal has been received from another sidelink device. For example, the transceiver 410, communication circuit 442, and processing circuit 444 shown and described above in connection with FIG. 4 may determine whether a JAS signal has been received.

If a JAS signal has been received from another sidelink device (Y branch of 1112), at block 1114, the transmitting sidelink device cancels the back-off timer. For example, the back-off control circuit 446 shown and described above in connection with FIG. 4 may cancel the back-off timer. If a JAS signal is not received prior to expiration of the back-off timer (N branch of 1114 and Y branch of 1110), at block 1114, the transmitting sidelink device generates and transmits a JAS signal to synchronize access to the unlicensed sidelink channel by the transmitting device and any other sidelink devices that may have traffic to transmit. For example, the transceiver 410, communication circuit 442, and processing circuit 444 shown and described above in connection with FIG. 4 may generate and transmit the JAS signal.

Figure 12:
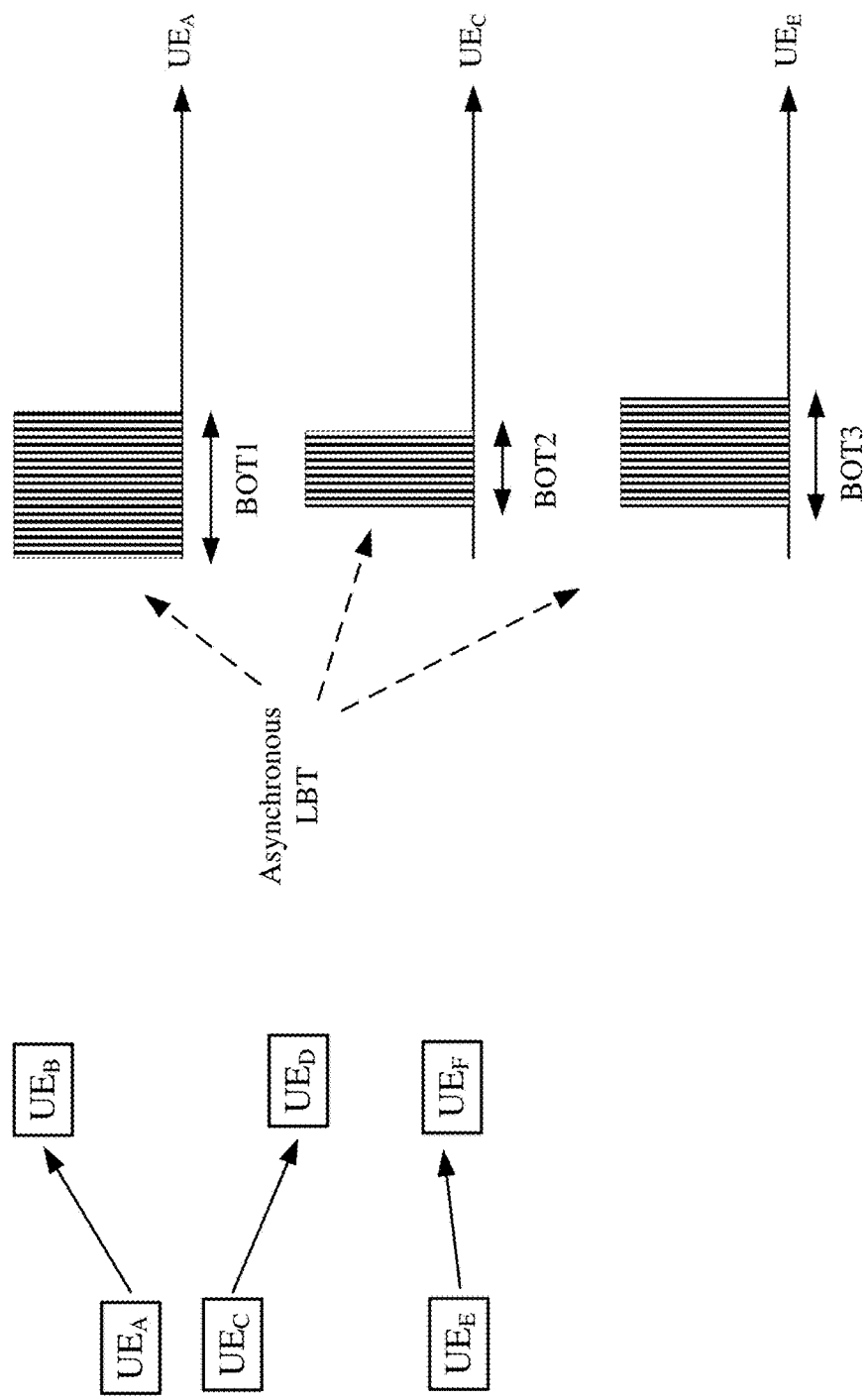
FIG. 12 is a diagram illustrating back-off mechanisms in unlicensed sidelink wireless communication according to some embodiments.

FIG. 12 is a diagram illustrating back-off mechanisms in unlicensed sidelink wireless communication according to some aspects of the present disclosure. In the example shown in FIG. 12, three sidelinks ($UE_A$->$UE_B$, $UE_C$->$UE_D$, and $UE_E$->$UE_F$) share an unlicensed channel (spectrum). Sidelink $UE_A$->$UE_B$ corresponds to a sidelink between $UE_A$ and $UE_B$, sidelink $UE_C$->$UE_D$ corresponds to a sidelink between $UE_C$ and $UE_D$, and sidelink $UE_E$->$UE_F$ corresponds to a sidelink between $UE_E$ and $UE_F$. If each of $UE_A$, $UE_C$, and $UE_E$ have traffic to transmit, each may perform independent and asynchronous LBT. For example, $UE_A$ may have traffic to transmit before $UE_C$ or $UE_E$, and therefore, $UE_A$ may initiate the LBT procedure prior to $UE_C$ or $UE_E$. Each of $UE_A$, $UE_C$ and $UE_E$ may listen to the unlicensed channel, and if the channel is idle, generate a respective back-off value (BOT1, BOT2, BOT3) and initialize a respective back-off timer with the generated back-off value. In the example shown in FIG. 12, the back-off value BOT2 generated by $UE_C$ is less than the back-off values BOT1 and BOT3 generated by both $UE_A$ and $UE_E$, respectively, while the back-off value BOT3 generated by $UE_E$ is less than the back-off value BOT1 generated by $UE_A$.

In various aspects of the present disclosure, each of the back-off values utilized by $UE_A$, $UE_C$, and $UE_E$ may be selected to ensure fair access to the unlicensed sidelink channel by a variety of types or categories of unlicensed devices (e.g., unlicensed sidelink devices and other devices utilizing the unlicensed spectrum, such as Wi-Fi, Bluetooth, etc.). In some examples, each of the sidelink devices may independently generate an estimate of the number of active sidelink devices. As used herein, the term active sidelink devices refers to sidelink devices within listening range that are actively accessing the unlicensed sidelink channel within a given period of time (e.g., sidelink devices that transmitted an STS over the unlicensed sidelink channel during a previous slot, sidelink channel reservation or other measure of time). Based on its estimate, each of the sidelink devices may select a respective back-off value for the sidelink device to use. For example, $UE_A$ may select a back-off value based on the number of active sidelink devices estimated by $UE_A$, $UE_C$ may select a back-off value based on the number of active sidelink devices estimated by $UE_C$, and $UE_E$ may select a back-off value based on the number of active sidelink devices estimated by $UE_E$.

Figure 13:
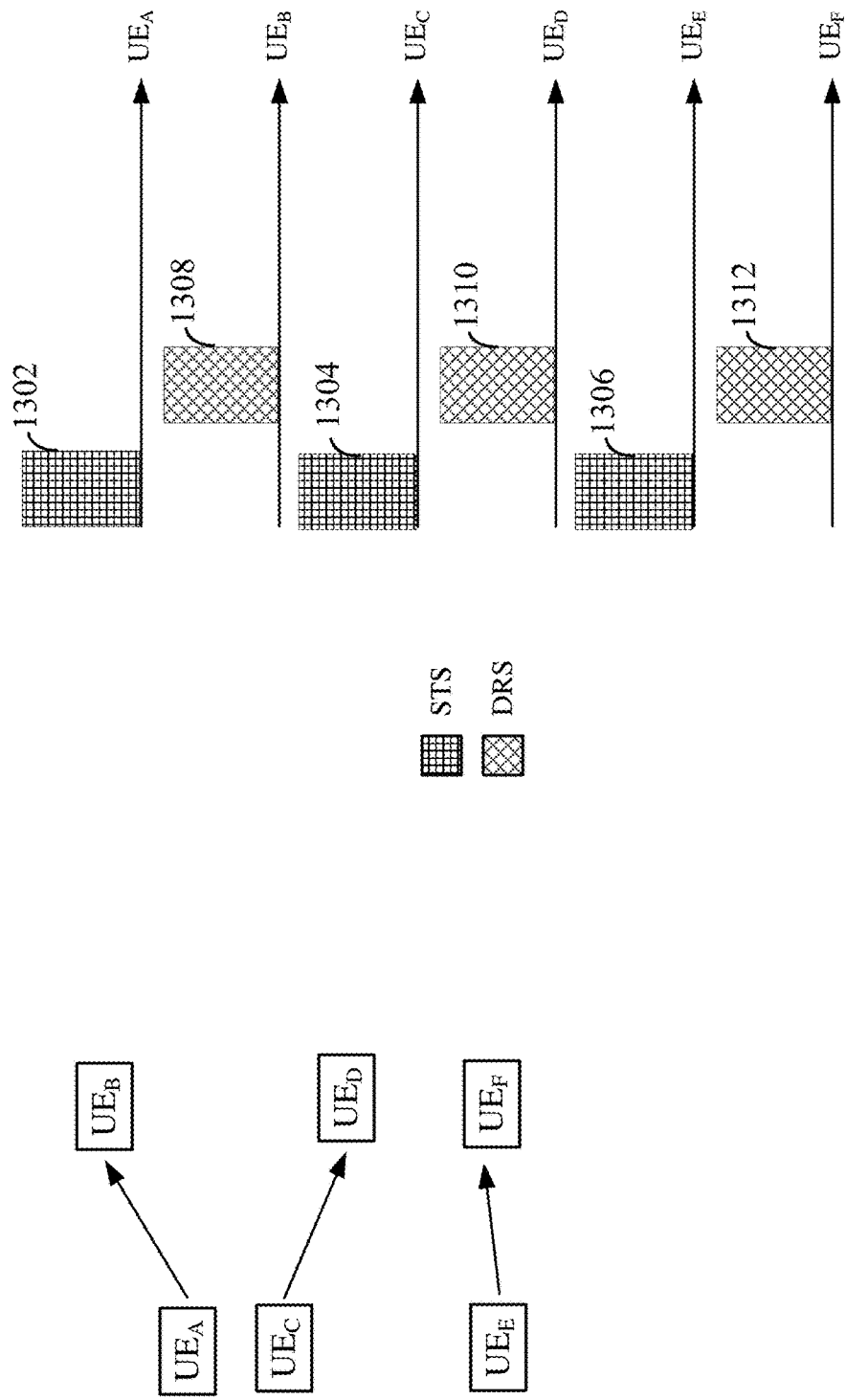
FIG. 13 is a diagram illustrating estimation of a number of sidelink devices based on distributed handshake signaling over an unlicensed sidelink channel according to some embodiments.

In some examples, referring to FIG. 13, the number of active sidelink devices may be estimated by monitoring the distributed handshake signaling (e.g., STS and/or DRSs) between sidelink devices on the unlicensed sidelink channel. In the example shown in FIG. 13, three sidelinks ($UE_A$->$UE_B$, $UE_C$->$UE_D$, and $UE_E$->$UE_F$) are again shown sharing an unlicensed channel (spectrum). Sidelink $UE_A$->$UE_B$ corresponds to the sidelink between $UE_A$ and $UE_B$, sidelink $UE_C$->$UE_D$ corresponds to the sidelink between $UE_C$ and $UE_D$, and sidelink $UE_E$->$UE_F$ corresponds to the sidelink between $UE_E$ and $UE_F$.

Each UE may maintain a list of active sidelink devices (e.g., a list of UE identifiers). The list of active sidelink devices may correspond to, for example, the list 418 shown in FIG. 4. Each UE may further monitor the unlicensed sidelink channel for STSs or DRSs (e.g., depending on whether the UE is a transmitting sidelink device or a receiving sidelink device) and update their respective list of active sidelink devices when an STS or DRS is received that is associated with a new transmitting sidelink device (e.g., a transmitting sidelink device not already included in the list). In some examples, the list of active sidelink devices may include a list of UE identifiers of the UEs that transmitted STSs (or received DRSs) during a previous sidelink slot, sidelink channel reservation or other measure of time.

For example, if $UE_A$ has traffic to send, $UE_A$ may transmit an STS 1302 during the STS portion of the sidelink slot. In addition, if $UE_C$ and $UE_E$ each also have traffic to send, $UE_C$ and $UE_E$ may each transmit a respective STS 1304 and 1306 during the STS portion of the sidelink slot. $UE_A$, $UE_C$, and $UE_E$ may each then monitor the unlicensed sidelink channel for DRSs during the DRS portion of the sidelink slot and update their respective lists of active sidelink devices when a DRS is subsequently received that is destined for a new transmitting (active) sidelink device. For example, $UE_A$ may detect a DRS 1310 sent from $UE_D$ that is destined for $UE_C$ and another DRS 1312 sent from $UE_F$ that is destined for $UE_E$. $UE_A$ may then add $UE_C$ and $UE_E$ to its list of active sidelink devices. Similarly, $UE_C$ may detect a DRS 1308 sent from $UE_B$ that is destined for $UE_A$ and the DRS 1312 sent from $UE_F$ that is destined for $UE_E$, and update its list accordingly. Likewise, $UE_E$ may detect the DRS 1308 sent from $UE_B$ that is destined for $UE_A$ and the DRS 1310 sent from $UE_D$ that is destined for $UE_C$, and update its list accordingly.

In a similar manner, since $UE_B$, $UE_D$, and $UE_F$ do not have traffic to send, $UE_B$, $UE_D$, and $UE_F$ may monitor the unlicensed sidelink channel for STSs during the STS portion of the sidelink slot and update their respective lists of active sidelink devices when an STS is received from a new transmitting (active) sidelink device. For example, $UE_B$ may detect the STS 1304 sent from $UE_C$ and the STS 1306 sent from $UE_E$, and update its list accordingly. Similarly, $UE_D$ may detect the STS 1302 sent from $UE_A$ and the STS 1306 sent from $UE_E$, and update its list accordingly. Likewise, $UE_F$ may detect the STS 1302 sent from $UE_A$ and the STS 1304 sent from $UE_C$, and update its list accordingly. It should be understood that each sidelink device may estimate a different number of active sidelink devices depending on the listening range of the sidelink device.

Each UE may further remove a sidelink device from their respective list of active sidelink devices if an STS was not transmitted from that sidelink device during the previous sidelink slot, sidelink channel reservation or other measure of time. Each UE may then each estimate the number of active sidelink devices as the number of UE identifiers within their respective list of active sidelink devices.

In some examples, each sidelink device may initialize the number of estimated active sidelink devices to zero, and update the estimated number of active sidelink devices over time. In other examples, each sidelink device may initialize the estimated number of active sidelink devices to a value greater than zero to provide a more accurate initial estimate. For example, each sidelink device may set an initial estimated number of active sidelink devices to a conservative predetermined value greater than zero, and then adapt or update the initial estimated number of sidelink devices over time based on the observed distributed handshake signaling. In the example shown in FIG. 12, $UE_A$ may initialize the estimated number of active sidelink devices to, for example, four, and then decrease this number to three upon observing DRSs from $UE_D$ and $UE_F$.

Each of the sidelink devices may further transmit sidelink device information indicating its estimated number of active sidelink devices to other sidelink devices over the unlicensed sidelink channel. In some examples, the sidelink device information may be included within STSs and/or DRSs. The sidelink device information may include the actual estimated number of active sidelink devices or a function of the estimated number of active sidelink devices. A receiving sidelink device may utilize the received sidelink device information to update and/or initialize its own estimated number of active sidelink devices. For example, a new sidelink device may receive sidelink device information from one or more other sidelink devices via STSs/DRSs transmitted on the sidelink channel and select a suitable function of the received sidelink device information (e.g., a maximum, average or other function of the received sidelink device information) as an initial estimated number of active sidelink devices.

Similarly, the receiving sidelink device may update the estimated number of active sidelink devices as a function of the received sidelink device information. For example, a receiving sidelink device may utilize a maximum, average or other function of the received sidelink device information to determine whether an update is needed. As an example, the receiving sidelink device may compare the received sidelink device information (or a function thereof) to its own current estimated number of active sidelink devices to determine whether the difference between the current estimated number of active sidelink devices and the received sidelink device information requires an update to the current estimated number of active sidelink devices (e.g., if the difference is greater than a threshold). In one example, the receiving device may modify the current estimated number of active sidelink devices to correspond to the received sidelink device information (or a function thereof).

Based on the current estimated number of active sidelink devices, a particular sidelink device may then select a back-off value and initialize a back-off timer with the selected back-off value. In some examples, the back-off value selected by a particular sidelink device may increase as the number of active sidelink devices increases. For example, the back-off value may be randomly selected from a predetermined initial back-off range corresponding to a particular baseline number (or number range) of active sidelink devices. The back-off range may then be increased or decreased according to a predetermined sliding scale or other function as the estimated number of sidelink devices increases or decreases relative to the baseline number (or number range). In some examples, the back-off value may be selected using a stochastic function that relies at least in part on a random parameter.

Figure 14:
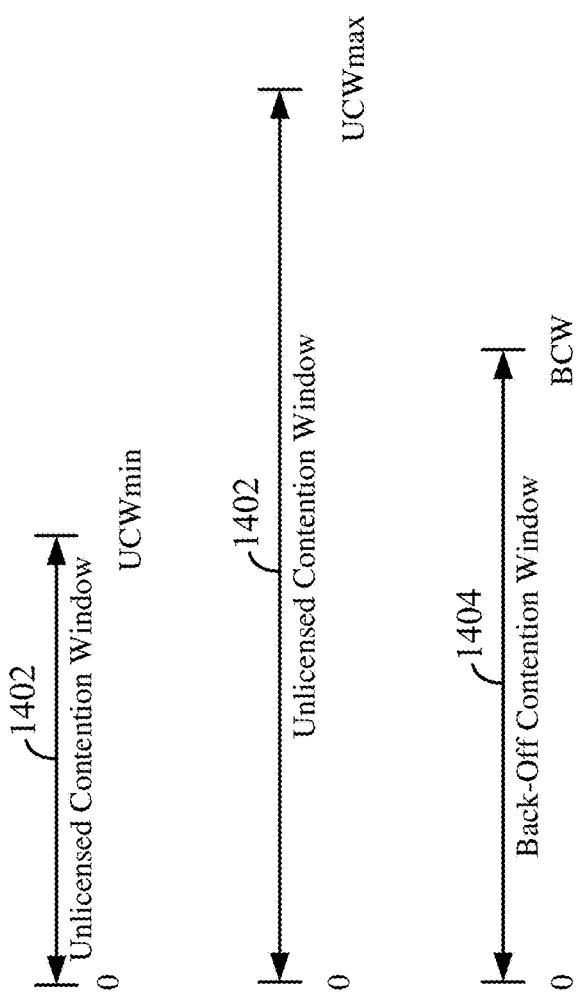
FIG. 14 is a diagram illustrating estimation of a number of sidelink devices based on contention windows according to some embodiments.

In a further example, the back-off value selected by a particular sidelink device may be a function of both the estimated number of active sidelink devices and an estimated number of non-sidelink devices (e.g., Wi-Fi, Bluetooth, etc.) that are actively accessing the unlicensed sidelink channel within the same given period of time. Referring now to FIG. 14, each of the sidelink devices may maintain an unlicensed device contention window 1402, which in some examples may be similar to contention windows utilized by Wi-Fi devices (e.g., IEEE 802.11 devices). The unlicensed device contention window 1402 may be considered to be representative of an estimated number of non-sidelink devices as a result of the adaptation of the contention window size, as discussed further below.

For example, each sidelink device may initialize its unlicensed device contention window 1402 with a minimum unlicensed device contention window size ($UCW_{min}$). Thus, the unlicensed device contention window 1402 may include values from zero up to $UCW_{min}$. Each sidelink device may then adapt its contention window size based on the success or failure of access attempts. For example, if a sidelink device attempts to access the sidelink channel by transmitting a JAS signal and the JAS signal collides with another signal, such as a Wi-Fi signal or other signal transmitted by a non-sidelink device, the sidelink device may increase the size of its unlicensed device contention window 1402. For example, the sidelink device may double the size of the unlicensed device contention window 1402 to a maximum contention window size $UCW_{max}$, where $UCW_{max}=2*UCW_{min}$. A collision may be assumed to have occurred, for example, if the sidelink device does not receive a DRS in response to transmitting an STS subsequent to the JAS signal. Similarly, if the sidelink device that transmitted the JAS signal and STS receives a DRS in response to the STS, the sidelink device may assume that the access attempt was successful, and therefore, reduce the size of its contention window (e.g., reduce the size to $UCW_{min}$).

As shown in FIG. 14, the unlicensed device contention window 1402 may be utilized to calculate a back-off contention window 1404, which is a function of both a current size of the unlicensed device contention window 1402 and the estimated number of sidelink devices. For example, the back-off contention window size (BCW) may be calculated as $BCW=((n+1)/2)*UCW$, where n is the number of sidelink devices and UCW is the current unlicensed device contention window size (e.g., $UCW_{min}$ or $UCW_{max}$). The back-off value may then be randomly selected from the back-off contention window 1404. For example, the back-off value may be randomly selected from values between zero and BCW (e.g., the current back-off contention window size). The sidelink device may then initialize the back-off timer with the randomly selected back-off value and decrement the back-off timer by one each slot or other measure of time. Using the above formula ensures that each sidelink device randomly selects their back-off value from a back-off contention window 1404 having a size at least equal to the contention window size utilized by non-sidelink devices, thus providing fair access to the unlicensed sidelink channel by both sidelink devices and non-sidelink devices.

Instead of selecting the back-off value from a back-off contention window calculated as a function of both the unlicensed device contention window size and the number of sidelink devices, in other examples, an actual estimate of the number of non-sidelink devices may be utilized together with the estimated number of sidelink devices to select the back-off value. In some examples, the estimated number of non-sidelink devices may be set to be equal to approximately half of the size of the unlicensed device contention window 1402.

Figure 15:
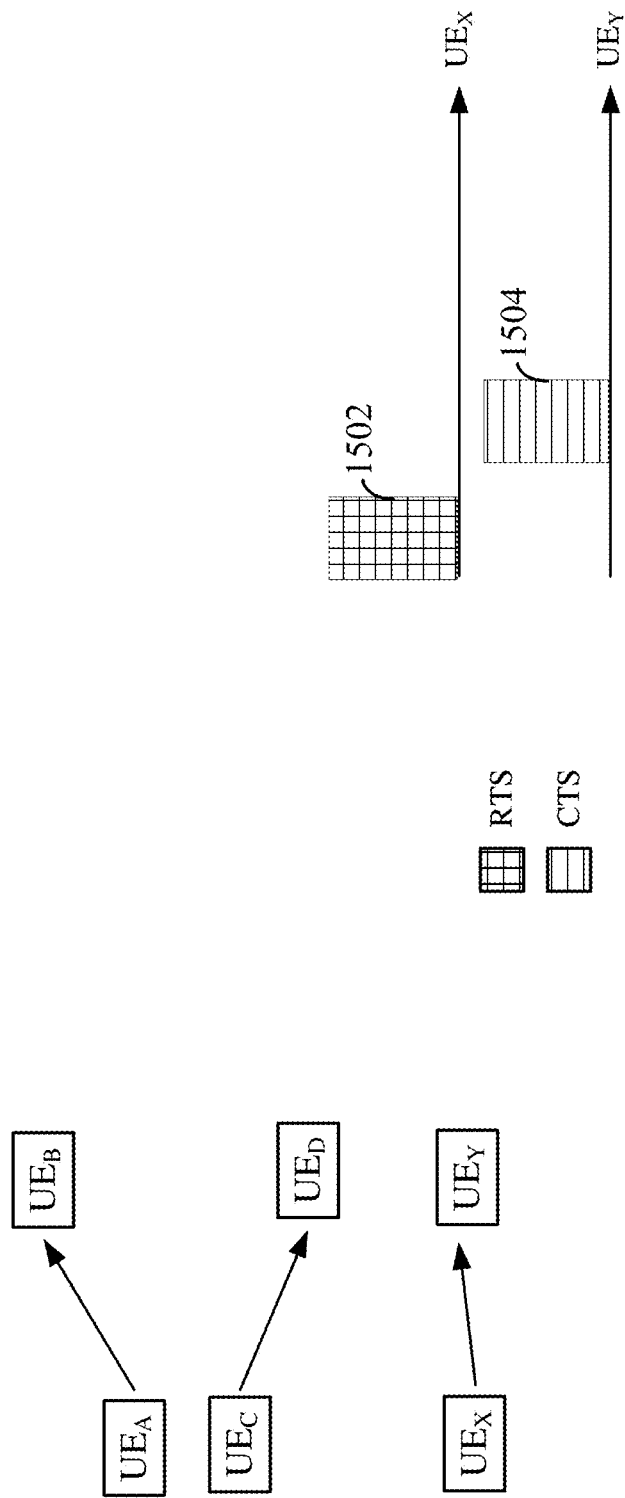
FIG. 15 is a diagram illustrating estimation of a number of non-sidelink devices according to some embodiments.

FIG. 15 illustrates the estimation of the number of non-sidelink devices by monitoring request-to-send (RTS) signals and/or clear-to-send (CTS) signals or other similar types of signals transmitted by non-sidelink devices over a given period of time. RTS and CTS signals are generally utilized in IEEE 802.11 networks to avoid network congestion resulting from packet collisions. For example, when a non-sidelink device, such as $UE_X$, has user data traffic to send to another non-sidelink device, such as $UE_Y$, $UE_X$ may transmit an RTS signal 1502 to $UE_Y$ that includes a Network Allocation Vector (NAV) indicating a duration of time that $UE_X$ is reserving the unlicensed sidelink channel for a non-sidelink communication. Upon correctly receiving the RTS, $UE_Y$ responds with a CTS signal 1504 confirming the reservation of the unlicensed sidelink channel for non-sidelink communication. $UE_X$ may then transmit the non-sidelink user data traffic to $UE_Y$ over the sidelink channel.

Sidelink devices, such as $UE_A$, $UE_B$, $UE_C$, and $UE_D$ may monitor the sidelink channel for RTS and/or CTS signals, and estimate the number of non-sidelink devices based on the observed RTS and/or CTS signals. For example, $UE_A$, $UE_B$, $UE_C$, and $UE_D$ may each receive the RTS signal 1502 and estimate the number of non-sidelink devices based on the received RTS signal 1502. In this example, $UE_A$, $UE_B$, $UE_C$, and $UE_D$ may each estimate that there is one non-sidelink device actively utilizing the unlicensed sidelink channel to transmit user data traffic.

In some examples, if the estimated number of active sidelink devices (e.g., two sidelink devices corresponding to $UE_A$ and $UE_C$) is greater than the estimated number of active non-sidelink devices (e.g., one non-sidelink device corresponding to $UE_X$), the average back-off value selected by sidelink devices may be greater than the average back-off value utilized by non-sidelink devices. Similarly, if the estimated number of sidelink devices is less than the estimated number of non-sidelink devices, the average back-off value selected by sidelink devices may be less than the average back-off value utilized by non-sidelink devices. For example, the back-off value may be selected from a sliding scale of values or back-off contention window ranges, where each value or back-off contention window range corresponds to a respective difference between the estimated number of sidelink devices and non-sidelink devices. The back-off value may also be selected based on another function of the estimated number of active sidelink devices and non-sidelink devices.

In some examples, the back-off value for a particular sidelink device may be selected as a function of respective weights applied to sidelink devices and non-sidelink devices. For example, since the JAS signal reserves the sidelink channel for use by all sidelink devices (to the exclusion of other unlicensed devices), the sum of the weights applied to all of the sidelink devices may equal the weight applied to one of the non-sidelink devices. Thus, the active sidelink devices may collectively be considered as one non-sidelink device. In this example, the back-off value may be selected such that a minimum back-off value of a set of back-off values utilized by the active sidelink devices is equal to an average back-off value utilized by the non-sidelink devices. In some examples, the average or minimum back-off value utilized by non-sidelink devices may be determined from the unlicensed device contention window maintained by the sidelink device. It should be understood that other weights may be applied to the active sidelink devices and non-sidelink devices and the back-off values may be selected as a function of those weights.

In some examples, the back-off value may further be updated in response to detecting a collision on the unlicensed sidelink channel. For example, a sidelink device performing LBT may increase the back-off contention window size or other back-off range utilized to randomly select the next back-off value or may increase a remaining time left (e.g., update the back-off value) of its back-off timer in response to detecting a collision on the sidelink channel. In this example, a collision may be assumed if the sidelink device is unable to decode a received JAS signal (e.g., due to interference from a transmission by another unlicensed device).

Figure 16:
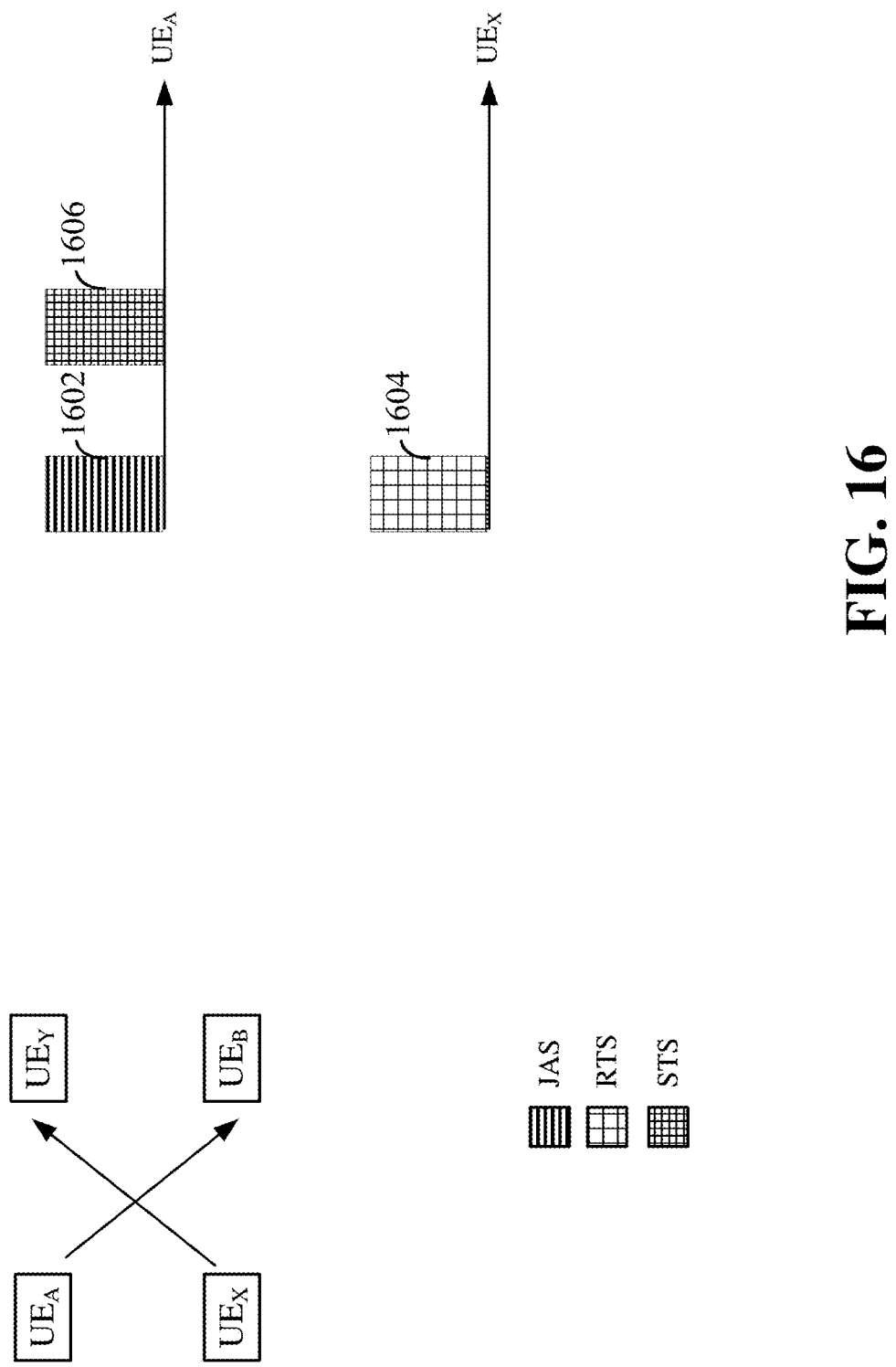
FIG. 16 is a diagram illustrating a collision between sidelink and non-sidelink communication over an unlicensed sidelink channel.

For example, as shown in FIG. 16, a collision between the transmission of a JAS signal 1602 by sidelink device $UE_A$ and the transmission of an RTS signal 1604 by non-sidelink device $UE_X$ may prevent $UE_B$ from decoding the JAS signal 1602. As such, $UE_B$ may increase its back-off contention window size. In addition, $UE_A$ may also increase its back-off contention window size after transmitting an STS 1606 and not receiving a DRS from $UE_B$ due to the inability of $UE_B$ to decode the JAS signal 1602. In addition, other sidelink devices (not shown) having user data traffic to transmit on the unlicensed sidelink channel may further freeze their respective back-off timers since the sidelink channel is no longer idle (e.g., as a result of the two interfering transmissions).

Figure 17:
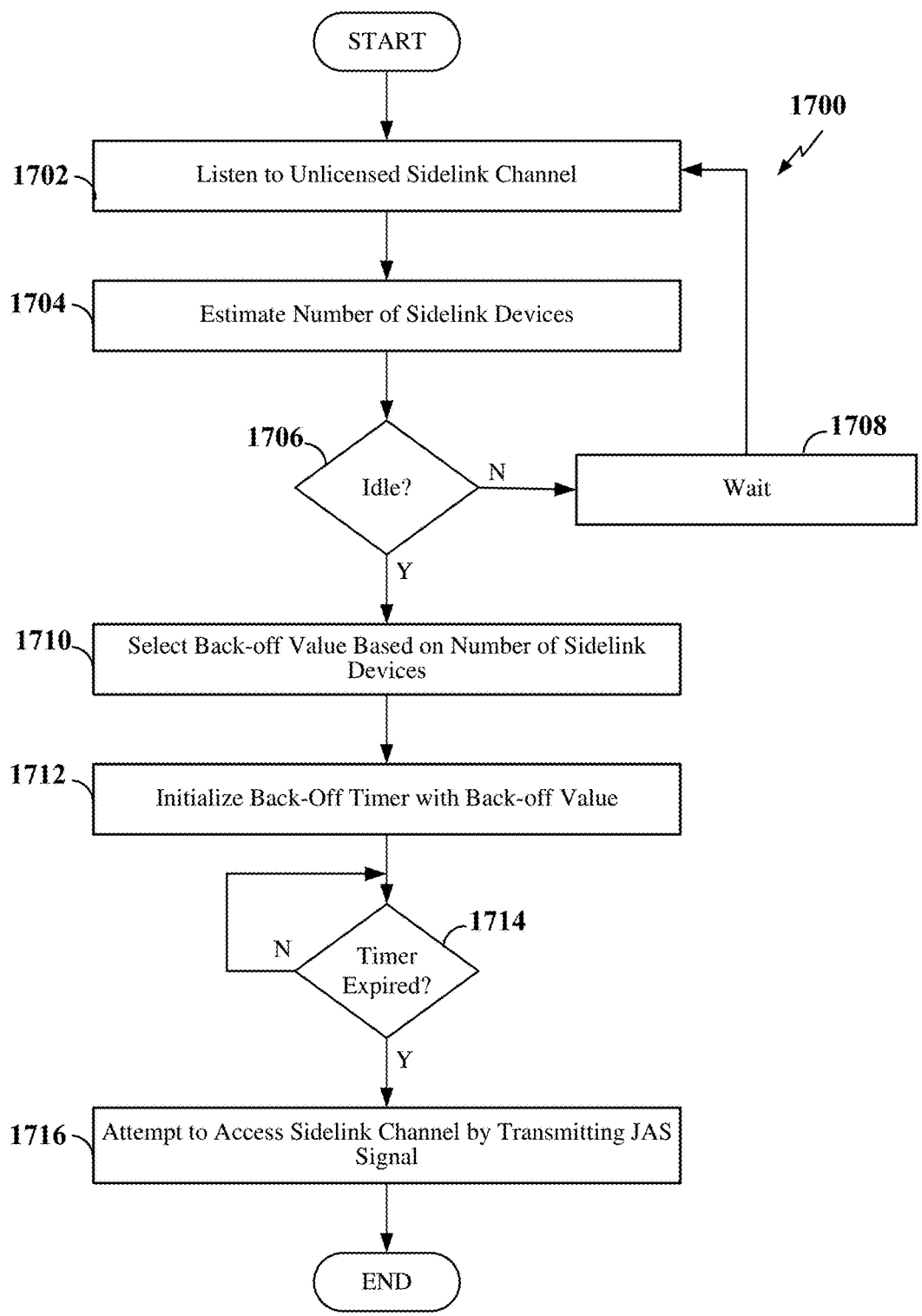
FIG. 17 is a flow chart illustrating an exemplary process for unlicensed sidelink communication utilizing back-off mechanisms according to some embodiments.

FIG. 17 is a flow chart illustrating a process 1700 for unlicensed sidelink communication utilizing back-off mechanisms in accordance with some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting sidelink device. It will be understood that the transmitting sidelink device may the user equipment 126 and/or 128 illustrated in FIG. 1; and/or the scheduled entity 204 illustrated in FIGS. 2 and 4. In some examples, the process 1700 may be carried out by any suitable apparatus or means for carrying out the functions or algorithm described below.

At block 1702, a transmitting sidelink device may listen to a sidelink channel including unlicensed spectrum (e.g., an unlicensed sidelink channel). For example, the transceiver 410 together with the communication circuit 442 shown and described above in reference to FIG. 4 may listen to the sidelink channel. At block 1704, the transmitting sidelink device may estimate the number of active sidelink devices. For example, the transmitting sidelink device may estimate the number of active sidelink devices based on previously received STSs or DRSs and/or sidelink device information included within the previously received STSs/DRSs, as described above. In a case where no prior information is available to generate the estimate, as described above, the transmitting sidelink device may initialize the estimate to any suitable value, such as zero or some other suitable number, and then adapt or update the estimate over time according to the process provided above. For example, the device estimation circuit 448 shown and described above in reference to FIG. 4 may estimate the number of active sidelink devices and maintain a list 418 of active sidelink devices.

At block 1706, the transmitting sidelink device may determine whether the unlicensed sidelink channel is idle. In some examples, the transmitting sidelink device may determine whether traffic is currently being transmitted over the unlicensed sidelink channel. For example, the transceiver 410 together with the communication circuit 442 shown and described above in reference to FIG. 4 may determine whether the unlicensed sidelink channel is idle. If the unlicensed sidelink channel is busy (N branch of 1706), at block 1708, the transmitting sidelink device waits until the channel is idle.

If the unlicensed sidelink channel is idle (Y branch of 1708), at block 1710, the transmitting sidelink device may then select a back-off value based on the estimated number of sidelink devices, and at block 1712, initialize a back-off timer with the back-off value. In some examples, the back-off value may be selected to provide fair access to the unlicensed sidelink channel by both the active sidelink devices and other types of unlicensed devices (e.g., Wi-Fi, Bluetooth, etc.). For example, the back-off value may be selected as a function of the estimated number of active sidelink devices or as a function of both the estimated number of active sidelink devices and an estimated number of non-sidelink devices. For example, the back-off timer control circuit 446 shown and described above in reference to FIG. 4 may select the back-off value and initialize the back-off timer 415.

At block 1714, the transmitting sidelink device may determine whether the back-off timer has expired. For example, the back-off timer control circuit 446 shown and described above in reference to FIG. 4 may determine whether the back-off timer has expired. If the back-off timer has expired (Y branch of 1714), at block 1716, the transmitting sidelink device may attempt to access the sidelink channel by generating and transmitting a JAS signal to synchronize access to the unlicensed sidelink channel by the transmitting sidelink device and any other sidelink devices that may have traffic to transmit. For example, the communication circuit 442 and processing circuit 444 shown and described above in connection with FIG. 4 may generate and transmit the JAS signal via the transceiver 410.

Figure 18:
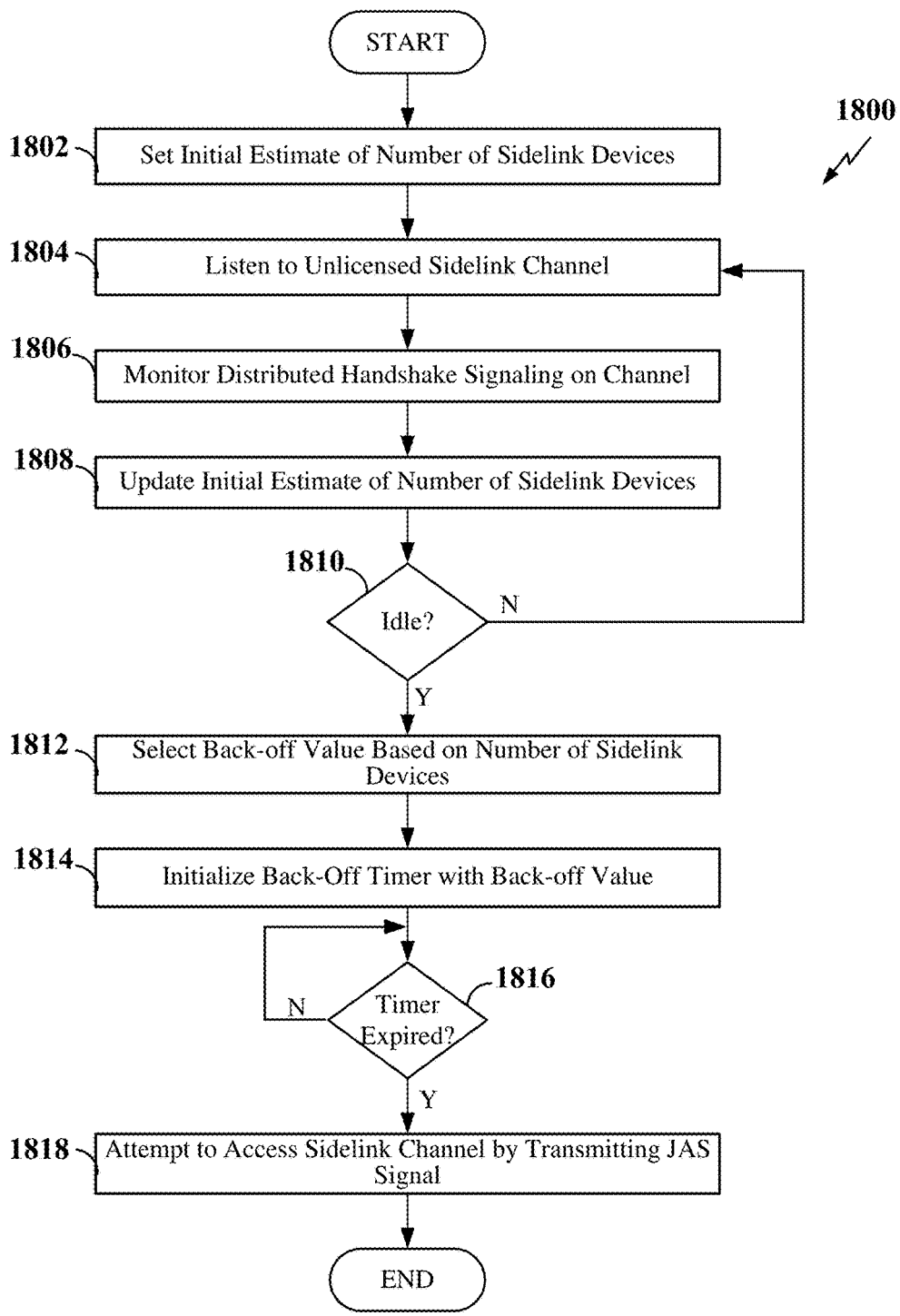
FIG. 18 is a flow chart illustrating another exemplary process for unlicensed sidelink communication utilizing back-off mechanisms according to some embodiments.

FIG. 18 is a flow chart illustrating another process 1800 for unlicensed sidelink communication utilizing back-off mechanisms in accordance with some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting sidelink device. It will be understood that the transmitting sidelink device may the user equipment 126 and/or 128 illustrated in FIG. 1; and/or the scheduled entity 204 illustrated in FIGS. 2 and 4. In some examples, the process 1800 may be carried out by any suitable apparatus or means for carrying out the functions or algorithm described below.

At block 1802, a transmitting sidelink device may set an initial estimate of the number of sidelink devices. In some examples, the transmitting sidelink device may initialize the number of estimated active sidelink devices to zero or to a value greater than zero to provide a more accurate initial estimate. For example, the device estimation circuit 448 shown and described above in reference to FIG. 4 may set the initial estimated number of sidelink devices. At block 1804, the transmitting sidelink device may listen to a sidelink channel including unlicensed spectrum (e.g., an unlicensed sidelink channel). For example, the transceiver 410 together with the communication circuit 442 shown and described above in reference to FIG. 4 may listen to the sidelink channel.

At block 1806, the transmitting sidelink device may monitor distributed handshake signaling on the unlicensed sidelink channel, and at block 1808, update the initial estimate of the number of sidelink devices based on the observed distributed handshake signaling. For example, the transmitting sidelink device may monitor STSs and/or DRSs transmitted on the unlicensed sidelink channel over a given duration of time, and may further consider sidelink device information included within the received STSs/DRSs, as described above, to update the estimated number of sidelink devices. For example, the device estimation circuit 448 shown and described above in reference to FIG. 4 may estimate the number of active sidelink devices and maintain a list 418 of active sidelink devices.

At block 1810, the transmitting sidelink device may determine whether the unlicensed sidelink channel is idle. In some examples, the transmitting sidelink device may determine whether traffic is currently being transmitted over the unlicensed sidelink channel. For example, the transceiver 410 together with the communication circuit 442 shown and described above in reference to FIG. 4 may determine whether the unlicensed sidelink channel is idle. If the unlicensed sidelink channel is busy (N branch of 1810), the process returns to block 1804, where the transmitting sidelink device continues to listen to the unlicensed sidelink channel.

If the unlicensed sidelink channel is idle (Y branch of 1810), at block 1812, the transmitting sidelink device may then select a back-off value based on the estimated number of sidelink devices, and at block 1814, initialize a back-off timer with the back-off value. In some examples, the back-off value may be selected to provide fair access to the unlicensed sidelink channel by both the active sidelink devices and other types of unlicensed devices (e.g., Wi-Fi, Bluetooth, etc.). For example, the back-off value may be selected as a function of the estimated number of active sidelink devices or as a function of both the estimated number of active sidelink devices and an estimated number of non-sidelink devices. For example, the back-off timer control circuit 446 shown and described above in reference to FIG. 4 may select the back-off value and initialize the back-off timer 415.

At block 1816, the transmitting sidelink device may determine whether the back-off timer has expired. For example, the back-off timer control circuit 446 shown and described above in reference to FIG. 4 may determine whether the back-off timer has expired. If the back-off timer has expired (Y branch of 1816), at block 1818, the transmitting sidelink device may attempt to access the sidelink channel by generating and transmitting a JAS signal to synchronize access to the unlicensed sidelink channel by the transmitting sidelink device and any other sidelink devices that may have traffic to transmit. For example, the communication circuit 442 and processing circuit 444 shown and described above in connection with FIG. 4 may generate and transmit the JAS signal via the transceiver 410.

Figure 19:
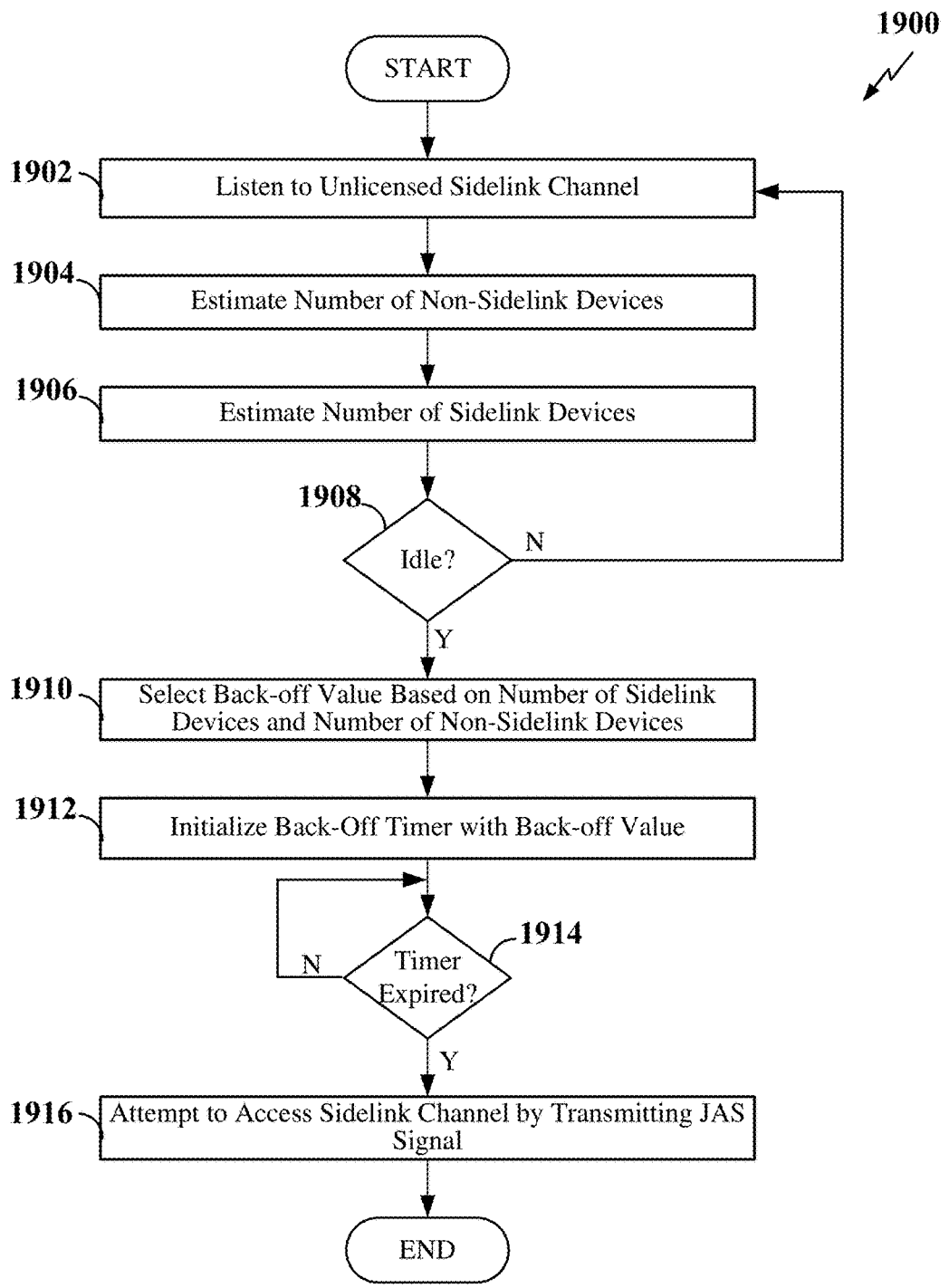
FIG. 19 is a flow chart illustrating another exemplary process for unlicensed sidelink communication utilizing back-off mechanisms according to some embodiments.

FIG. 19 is a flow chart illustrating another process 1900 for unlicensed sidelink communication utilizing back-off mechanisms in accordance with some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting sidelink device. It will be understood that the transmitting sidelink device may the user equipment 126 and/or 128 illustrated in FIG. 1; and/or the scheduled entity 204 illustrated in FIGS. 2 and 4. In some examples, the process 1900 may be carried out by any suitable apparatus or means for carrying out the functions or algorithm described below.

At block 1902, a transmitting sidelink device may listen to a sidelink channel including unlicensed spectrum (e.g., an unlicensed sidelink channel). For example, the transceiver 410 together with the communication circuit 442 shown and described above in reference to FIG. 4 may listen to the sidelink channel.

At block 1904, the transmitting sidelink device may estimate a number of non-sidelink devices. In some examples, the transmitting sidelink device may monitor request-to-send (RTS) signals and/or clear-to-send (CTS) signals or other similar types of signals transmitted by non-sidelink devices over a given period of time to estimate the number of non-sidelink devices. For example, the device estimation circuit 448 shown and described above in reference to FIG. 4 may estimate the number of non-sidelink devices.

At block 1906, the transmitting sidelink device may estimate the number of active sidelink devices. For example, the transmitting sidelink device may estimate the number of active sidelink devices based on previously received STSs or DRSs and/or sidelink device information included within the previously received STSs/DRSs, as described above. In a case where no prior information is available to generate the estimate, as described above, the transmitting sidelink device may initialize the estimate to any suitable value, such as zero or some other suitable number, and then adapt or update the estimate over time according to the process provided above. For example, the device estimation circuit 448 shown and described above in reference to FIG. 4 may estimate the number of active sidelink devices and maintain a list 418 of active sidelink devices.

At block 1908, the transmitting sidelink device may determine whether the unlicensed sidelink channel is idle. In some examples, the transmitting sidelink device may determine whether traffic is currently being transmitted over the unlicensed sidelink channel. For example, the transceiver 410 together with the communication circuit 442 shown and described above in reference to FIG. 4 may determine whether the unlicensed sidelink channel is idle. If the unlicensed sidelink channel is busy (N branch of 1908), the process returns to block 1902, where the transmitting sidelink device continues to listen to the unlicensed sidelink channel.

If the unlicensed sidelink channel is idle (Y branch of 1908), at block 1910, the transmitting sidelink device may then select a back-off value based on the estimated number of sidelink devices, and at block 1912, initialize a back-off timer with the back-off value. In some examples, the back-off value may be selected to provide fair access to the unlicensed sidelink channel by both the active sidelink devices and the active non-sidelink devices. For example, if the estimated number of active sidelink devices is greater than the estimated number of active non-sidelink devices, the average back-off value selected by sidelink devices may be greater than the average back-off value utilized by non-sidelink devices. Similarly, if the estimated number of sidelink devices is less than the estimated number of non-sidelink devices, the average back-off value selected by sidelink devices may be less than the average back-off value utilized by non-sidelink devices. For example, the back-off value may be selected from a sliding scale of values or back-off contention window ranges, where each value or back-off contention window range corresponds to a respective difference between the estimated number of sidelink devices and non-sidelink devices. The back-off value may also be selected based on another function of the estimated number of active sidelink devices and non-sidelink devices, such as a function of respective weights applied to sidelink devices and non-sidelink devices. For example, the back-off timer control circuit 446 shown and described above in reference to FIG. 4 may select the back-off value and initialize the back-off timer 415.

At block 1914, the transmitting sidelink device may determine whether the back-off timer has expired. For example, the back-off timer control circuit 446 shown and described above in reference to FIG. 4 may determine whether the back-off timer has expired. If the back-off timer has expired (Y branch of 1914), at block 1916, the transmitting sidelink device may attempt to access the sidelink channel by generating and transmitting a JAS signal to synchronize access to the unlicensed sidelink channel by the transmitting sidelink device and any other sidelink devices that may have traffic to transmit. For example, the communication circuit 442 and processing circuit 444 shown and described above in connection with FIG. 4 may generate and transmit the JAS signal via the transceiver 410.

Figure 20:
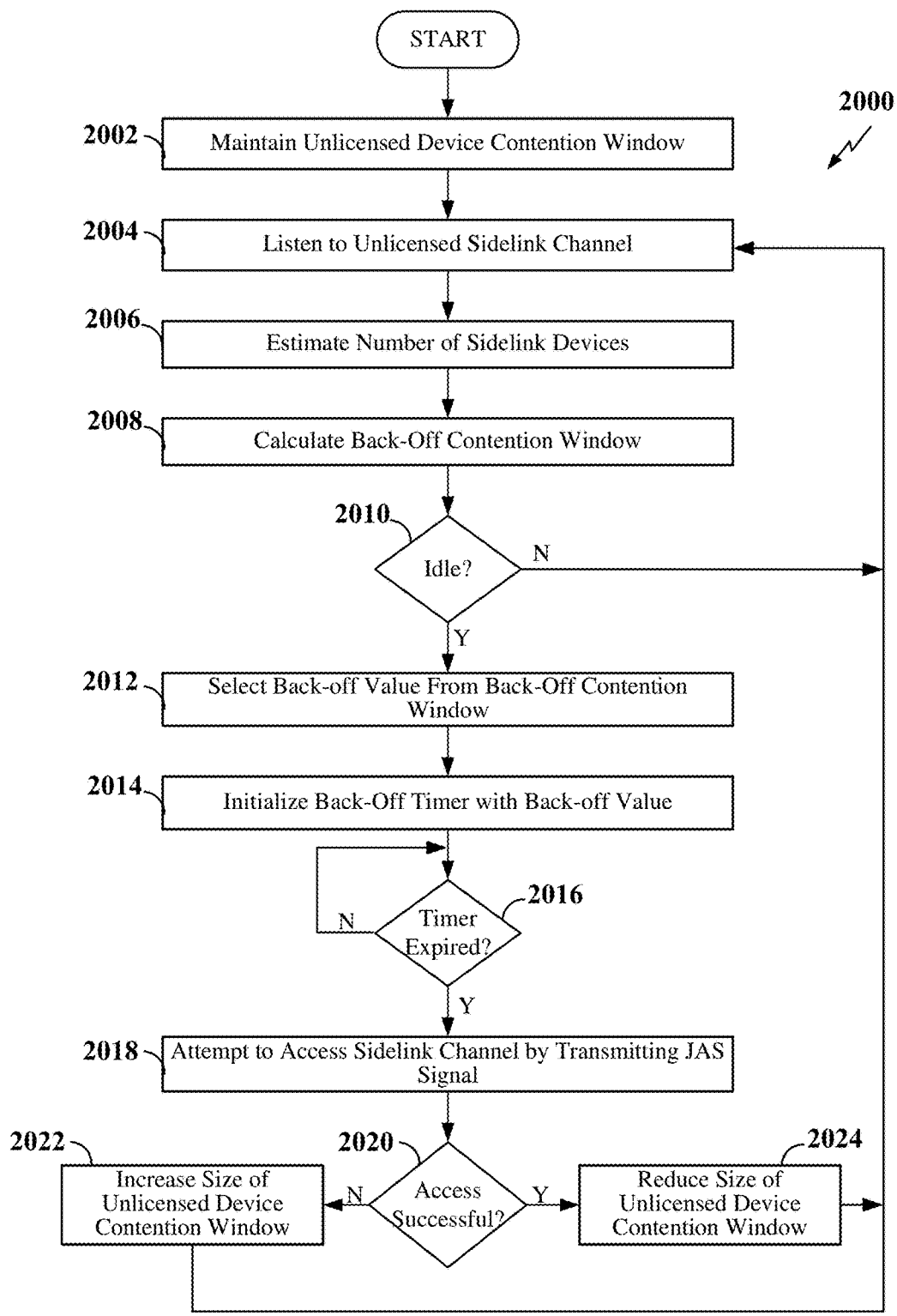
FIG. 20 is a flow chart illustrating another exemplary process for unlicensed sidelink communication utilizing back-off mechanisms according to some embodiments.

FIG. 20 is a flow chart illustrating another process 2000 for unlicensed sidelink communication utilizing back-off mechanisms in accordance with some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting sidelink device. It will be understood that the transmitting sidelink device may the user equipment 126 and/or 128 illustrated in FIG. 1; and/or the scheduled entity 204 illustrated in FIGS. 2 and 4. In some examples, the process 2000 may be carried out by any suitable apparatus or means for carrying out the functions or algorithm described below.

At block 2002, a transmitting sidelink device may maintain an unlicensed device contention window. The unlicensed device contention window may be considered to be representative of an estimated number of non-sidelink devices as a result of the adaptation of the contention window size. In some examples, the transmitting sidelink device may initialize the unlicensed device contention window with a minimum unlicensed device contention window size. The transmitting sidelink device may then adapt its contention window size based on the success or failure of access attempts, as discussed below. For example, the device estimation circuit 448 shown and described above in reference to FIG. 4 may maintain the unlicensed device contention window. At block 2004, the transmitting sidelink device may listen to a sidelink channel including unlicensed spectrum (e.g., an unlicensed sidelink channel). For example, the transceiver 410 together with the communication circuit 442 shown and described above in reference to FIG. 4 may listen to the sidelink channel.

At block 2006, the transmitting sidelink device may estimate the number of active sidelink devices. For example, the transmitting sidelink device may estimate the number of active sidelink devices based on previously received STSs or DRSs and/or sidelink device information included within the previously received STSs/DRSs, as described above. In a case where no prior information is available to generate the estimate, as described above, the transmitting sidelink device may initialize the estimate to any suitable value, such as zero or some other suitable number, and then adapt or update the estimate over time according to the process provided above. For example, the device estimation circuit 448 shown and described above in reference to FIG. 4 may estimate the number of active sidelink devices and maintain a list 418 of active sidelink devices.

At block 2008, the transmitting sidelink device may calculate a back-off contention window based on the unlicensed device contention window and the estimated number of active sidelink devices. For example, the device estimation circuit 448 shown and described above in reference to FIG. 4 may calculate the back-off contention window.

At block 2010, the transmitting sidelink device may determine whether the unlicensed sidelink channel is idle. In some examples, the transmitting sidelink device may determine whether traffic is currently being transmitted over the unlicensed sidelink channel. For example, the transceiver 410 together with the communication circuit 442 shown and described above in reference to FIG. 4 may determine whether the unlicensed sidelink channel is idle. If the unlicensed sidelink channel is busy (N branch of 1810), the process returns to block 2004, where the transmitting sidelink device continues to listen to the unlicensed sidelink channel.

If the unlicensed sidelink channel is idle (Y branch of 2010), at block 2012, the transmitting sidelink device may then select a back-off value from the back-off contention window, and at block 1814, initialize a back-off timer with the back-off value. In some examples, the back-off value may be randomly selected from the back-off contention window. For example, the back-off timer control circuit 446 shown and described above in reference to FIG. 4 may select the back-off value and initialize the back-off timer 415.

At block 2016, the transmitting sidelink device may determine whether the back-off timer has expired. For example, the back-off timer control circuit 446 shown and described above in reference to FIG. 4 may determine whether the back-off timer has expired. If the back-off timer has expired (Y branch of 2016), at block 2018, the transmitting sidelink device may attempt to access the sidelink channel by generating and transmitting a JAS signal to synchronize access to the unlicensed sidelink channel by the transmitting sidelink device and any other sidelink devices that may have traffic to transmit. For example, the communication circuit 442 and processing circuit 444 shown and described above in connection with FIG. 4 may generate and transmit the JAS signal via the transceiver 410.

At block 2020, the transmitting sidelink device may determine whether the access attempt was successful. If the access attempt was not successful (N branch of block 2020), at block 2022, the transmitting sidelink device may increase the size of the unlicensed device contention window and the process then returns to block 2002. For example, if the transmitting sidelink device attempts to access the sidelink channel by transmitting a JAS signal and the JAS signal collides with another signal, such as a Wi-Fi signal or other signal transmitted by a non-sidelink device, the sidelink device may increase the size of its unlicensed device contention window (e.g., by doubling the size of the unlicensed device contention window). However, if the access attempt was successful (Y branch of block 2020), at block 2024, the transmitting device may decrease the size of the unlicensed device contention window and the process then returns to block 2002. For example, if the transmitting sidelink device transmits the JAS signal and STS and then receives a DRS in response to the STS, the transmitting sidelink device may assume that the access attempt was successful, and therefore, reduce the size of its contention window (e.g., to a minimum unlicensed device contention window size).

Figure 21:
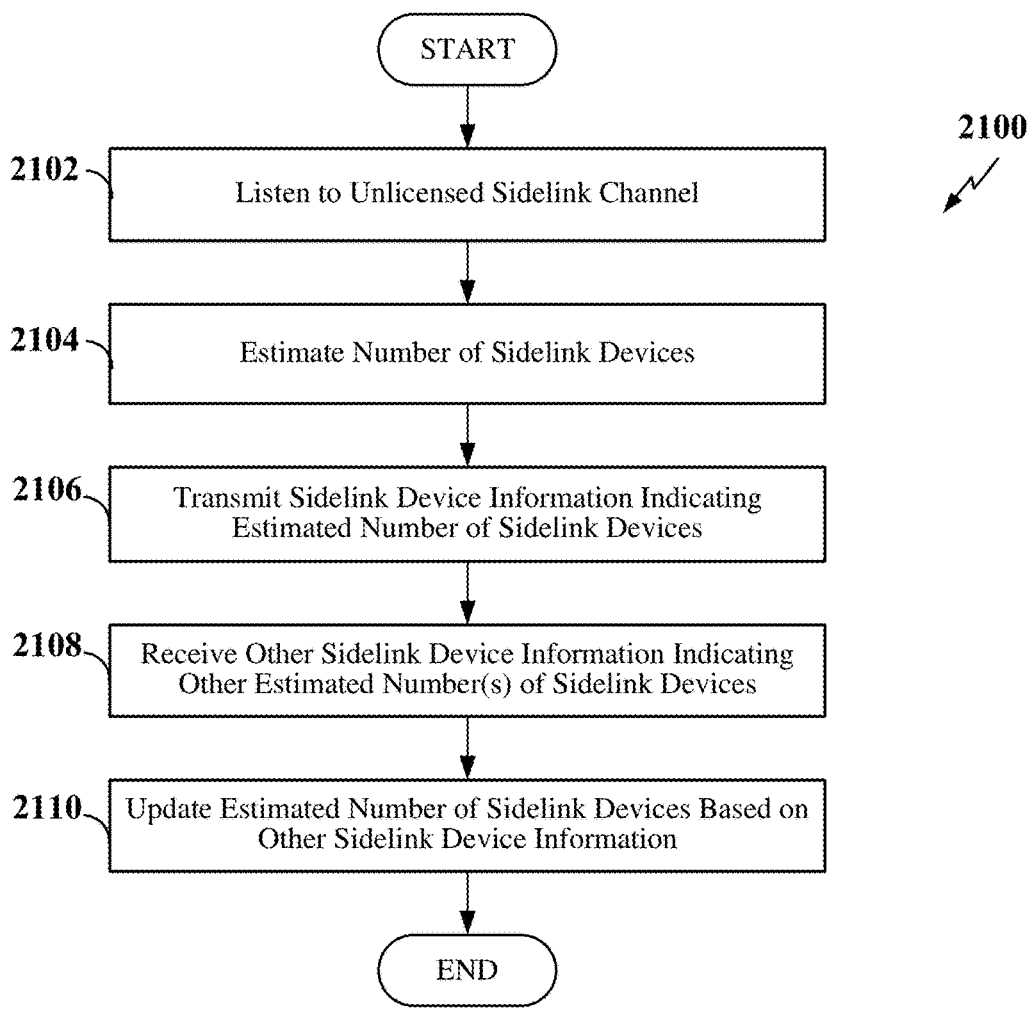
FIG. 21 is a flow chart illustrating an exemplary process for updating an estimated number of sidelink devices according to some embodiments.

FIG. 21 is a flow chart illustrating a process 2100 for estimating the number of sidelink devices in accordance with some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting sidelink device. It will be understood that the transmitting sidelink device may the user equipment 126 and/or 128 illustrated in FIG. 1; and/or the scheduled entity 204 illustrated in FIGS. 2 and 4. In some examples, the process 2100 may be carried out by any suitable apparatus or means for carrying out the functions or algorithm described below.

At block 2102, the transmitting sidelink device may listen to a sidelink channel including unlicensed spectrum (e.g., an unlicensed sidelink channel). For example, the transceiver 410 together with the communication circuit 442 shown and described above in reference to FIG. 4 may listen to the sidelink channel.

At block 2104, the transmitting device may estimate the number of active sidelink devices. For example, the transmitting sidelink device may estimate the number of active sidelink devices based on previously received STSs or DRSs and/or sidelink device information included within the previously received STSs/DRSs, as described above. In a case where no prior information is available to generate the estimate, as described above, the transmitting sidelink device may initialize the estimate to any suitable value, such as zero or some other suitable number, and then adapt or update the estimate over time according to the process provided above. For example, the device estimation circuit 448 shown and described above in reference to FIG. 4 may estimate the number of active sidelink devices and maintain a list 418 of active sidelink devices.

At block 2106, the transmitting sidelink device may transmit sidelink device information indicating the estimated number of sidelink device to other sidelink devices. In some examples, the transmitting sidelink device may include the sidelink device information within an STS transmitted over the unlicensed sidelink channel. The sidelink device information may include the actual estimated number of active sidelink devices or a function of the estimated number of active sidelink devices. For example, the communication circuit 442 and processing circuit 444 shown and described above in reference to FIG. 4 may transmit the sidelink device information via the transceiver 410.

At block 2108, the transmitting sidelink device may further receive other sidelink device information indicating other estimated number(s) of sidelink devices from other sidelink devices. In some examples, the transmitting sidelink device may receive the other sidelink device information within a DRS received over the unlicensed sidelink channel. For example, the communication circuit 442 and processing circuit 444 shown and described above in reference to FIG. 4 may receive the other sidelink device information via the transceiver 410.

At block 2110, the transmitting sidelink device may update the estimated number of sidelink devices based on the other sidelink device information. For example, the transmitting sidelink device may utilize a maximum, average or other function of the received other sidelink device information to determine whether an update is needed. As an example, the transmitting sidelink device may compare the received other sidelink device information (or a function thereof) to its own current estimated number of active sidelink devices to determine whether the difference between the current estimated number of active sidelink devices and the received sidelink device information requires an update to the current estimated number of active sidelink devices (e.g., if the difference is greater than a threshold). In one example, the transmitting sidelink device may modify the current estimated number of active sidelink devices to correspond to the received other sidelink device information (or a function thereof). For example, the device estimation circuit 448 shown and described above in reference to FIG. 4 may update the estimated number of sidelink devices.

Figure 22:
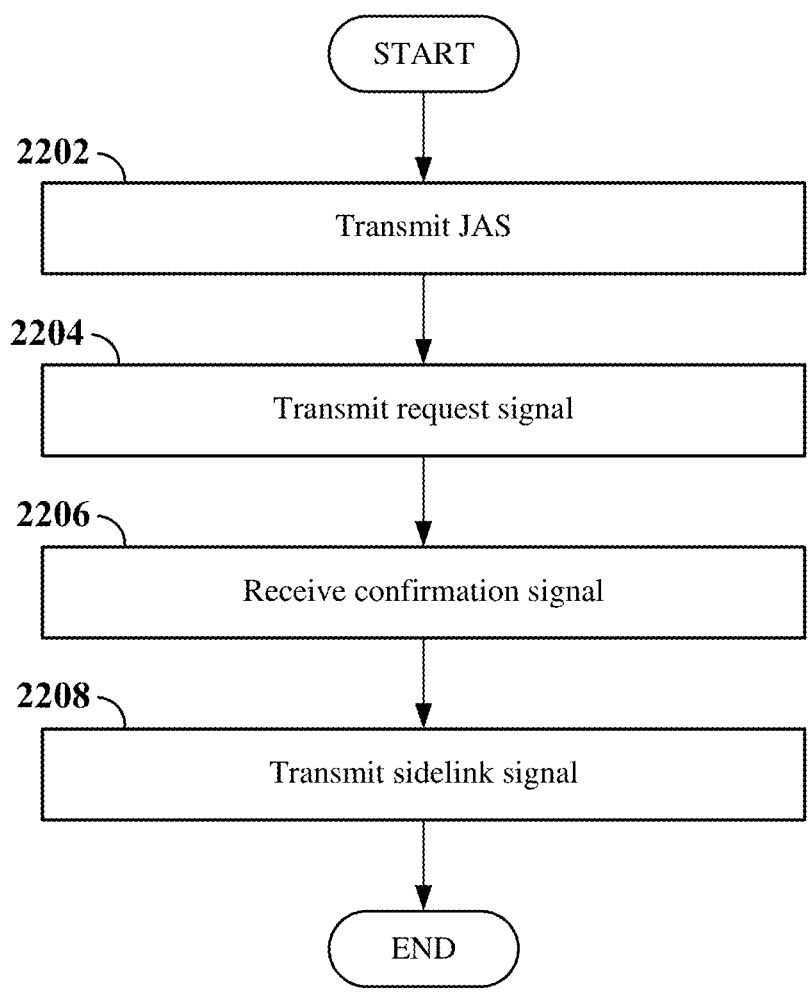
FIG. 22 is a flow chart illustrating an exemplary process for unlicensed sidelink communication according to some embodiments.

FIG. 22 is a flow chart illustrating a process 2200 for unlicensed sidelink communication in accordance with some aspects of the present disclosure. As described below, some or all illustrated features may be omitted in a particular implementation within the scope of the present disclosure, and some illustrated features may not be required for implementation of all embodiments. In the following description, a sidelink signal transmission is discussed with reference to a transmitting device and a receiving device. It will be understood that either device may be the user equipment 126 and/or 128 illustrated in FIG. 1; and/or the scheduled entity 204 illustrated in FIGS. 2 and 4. In some examples, the process 2200 may be carried out by any suitable apparatus or means for carrying out the functions or algorithm described below.

At block 2202, a transmitting device may transmit a JAS signal including a total duration of time to reserve an unlicensed sidelink channel for sidelink communication. For example, the JAS signal may include NAV information indicating the total duration of time. At block 2204, the transmitting device may transmit a request signal indicating a requested first duration of time within the total duration of time for the transmitting device to utilize the unlicensed sidelink channel to transmit a sidelink signal. In some examples, the transmitting device is a primary device, and the request signal may include both a primary request signal (e.g., a DSS) and a secondary request signal (e.g., STS). If the transmitting device is not a primary device, the request signal may include only the secondary request signal (e.g., STS). In addition, if the transmitting device is not a primary device, the transmitting device may further receive an additional request signal from an additional device indicating an additional requested duration of time overlapping the first duration of time for the additional device to utilize the unlicensed sidelink channel to transmit an additional sidelink signal.

At block 2206, the transmitting device may then receive a confirmation signal (e.g., a DRS) from a receiving device. The confirmation signal may indicate the availability of the unlicensed sidelink channel for the first requested duration of time. At block 2208, the transmitting device may then transmit the sidelink signal over the unlicensed sidelink channel.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-22 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-4 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c"

is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of sidelink wireless communication, comprising:
   listening to a sidelink channel comprising unlicensed spectrum;
   estimating a number of sidelink devices that are actively accessing the sidelink channel within a given period of time to determine a current estimated number of active sidelink devices, wherein estimating the number of sidelink devices comprises:
      monitoring distributed handshake signaling between the sidelink devices to generate a list of active sidelink devices; and
      determining the current estimated number of active sidelink devices using the list of active sidelink devices;
   estimating a number of non-sidelink devices that are actively accessing the sidelink channel within the given period of time to determine a current estimated number of active non-sidelink devices, wherein a first communication protocol is utilized for communication between the sidelink devices over the sidelink channel and a second communication protocol different than the first communication protocol is utilized for communication between the non-sidelink devices over the sidelink channel;
   when the sidelink channel is idle:
      selecting a back-off value for a back-off timer based on at least the current estimated number of active sidelink devices and the current estimated number of active non-sidelink devices;
      initializing the back-off timer with the back-off value; and
      upon expiration of the back-off timer, performing an access attempt of the sidelink channel by transmitting a joint access synchronization (JAS) signal comprising a duration of time that the sidelink channel may be accessed by the sidelink devices.

2. The method of claim 1, wherein monitoring the distributed handshake signaling between the sidelink devices further comprises:
   monitoring at least one of source transmit signals transmitted by the sidelink devices or destination receive signals transmitted by the sidelink devices to determine the current estimated number of active sidelink devices.

3. The method of claim 1, wherein estimating the number of non-sidelink devices further comprises:
   maintaining an unlicensed device contention window, wherein the unlicensed device contention window is representative of the current estimated number of active non-sidelink devices.

4. The method of claim 3, wherein estimating the number of non-sidelink devices further comprises:
   adapting a size of the unlicensed device contention window based on whether the access attempt was successful.

5. The method of claim 3, wherein selecting the back-off value further comprises:
   calculating a back-off contention window as a function of the unlicensed device contention window and the current estimated number of active sidelink devices; and
   randomly selecting the back-off value from the back-off contention window.

6. The method of claim 4, wherein adapting the size of the unlicensed contention window further comprises:
   reducing the size of the unlicensed device contention window when the access attempt was successful; and
   increasing the size of the unlicensed device contention window when the access attempt was not successful.

7. The method of claim 1, further comprising:
   transmitting sidelink device information indicating the current estimated number of active sidelink devices within at least one of a source transmit signal or a destination receive signal.

8. The method of claim 1, wherein estimating the number of sidelink devices further comprises:
   receiving other estimated numbers of sidelink devices from other sidelink devices within at least one of source transmit signals or destination receive signals; and
   updating the current estimated number of active sidelink devices based on the other estimated numbers of sidelink devices.

9. The method of claim 1, wherein estimating the number of sidelink devices further comprises:
   setting an initial estimated number of sidelink devices; and
   adapting the initial estimated number of sidelink devices to produce the current estimated number of active sidelink devices based on the distributed handshake signaling between the sidelink devices.

10. The method of claim 1, wherein selecting the back-off value further comprises:
   selecting the back-off value such that a minimum back-off value of a set of back-off values utilized by the current estimated number of active sidelink devices is equal to an average back-off value utilized by non-sidelink devices that are actively accessing the sidelink channel.

11. The method of claim 1, further comprising:
   updating the back-off value in response to detecting a collision on the sidelink channel.

12. The method of claim 1, further comprising:
   transmitting a source transmit signal (STS) from a first transmitting device, the STS indicating a first requested duration of time for the first transmitting device to utilize the sidelink channel to transmit a sidelink signal;
   receiving a destination receive signal (DRS) at the first transmitting device, the DRS indicating availability of the sidelink channel for the first requested duration of time; and
   transmitting the sidelink signal from the first transmitting device over the sidelink channel.

13. The method of claim 12, further comprising:
   receiving an additional STS at the first transmitting device, the additional STS indicating an additional requested duration of time overlapping the first requested duration of time for an additional transmitting device to utilize the sidelink channel to transmit an additional sidelink signal.

14. The method of claim 1, further comprising:
freezing the back-off timer when the sidelink channel becomes busy.

15. An apparatus for sidelink wireless communication, the apparatus comprising:
a processor;
a transceiver communicatively coupled to the processor; and
a memory communicatively coupled to the processor, wherein the processor is configured to:
listen to a sidelink channel comprising unlicensed spectrum;
estimate a number of sidelink devices that are actively accessing the sidelink channel within a given period of time to determine a current estimated number of active sidelink devices, wherein the processor is further configured to estimate the number of sidelink devices by:
monitoring distributed handshake signaling between the sidelink devices to generate a list of active sidelink devices; and
determining the current estimated number of active sidelink devices using the list of active sidelink devices;
estimate a number of non-sidelink devices that are actively accessing the sidelink channel within the given period of time to determine a current estimated number of active non-sidelink devices, wherein a first communication protocol is utilized for communication between the sidelink devices over the sidelink channel and a second communication protocol different than the first communication protocol is utilized for communication between the non-sidelink devices over the sidelink channel;
select a back-off value for a back-off timer based on at least the current estimated number of active sidelink devices and the current estimated number of active non-sidelink devices when the sidelink channel is idle;
initializing the back-off timer with the back-off value; and
upon expiration of the back-off timer, perform an access attempt of the sidelink channel by transmitting a joint access synchronization (JAS) signal comprising a duration of time that the sidelink channel may be accessed by the sidelink devices.

16. The apparatus of claim 15, wherein the processor is further configured to:
monitor at least one of source transmit signals transmitted by the sidelink devices or destination receive signals transmitted by the sidelink devices to determine the current estimated number of active sidelink devices.

17. The apparatus of claim 15, wherein the processor is further configured to:
maintain an unlicensed device contention window, wherein the unlicensed device contention window is representative of the current estimated number of active non-sidelink devices.

18. The apparatus of claim 17, wherein the processor is further configured to:
reduce a size of the unlicensed device contention window when the access attempt is successful; and
increase the size of the unlicensed device contention window when the access attempt is not successful.

19. The apparatus of claim 17, wherein the processor is further configured to:
calculate a back-off contention window as a function of the unlicensed device contention window and the current estimated number of sidelink devices; and
randomly select the back-off value from the back-off contention window.

20. The apparatus of claim 15, wherein the processor is further configured to:
transmit sidelink device information indicating the current estimated number of active sidelink devices within at least one of a source transmit signal or a destination receive signal.

21. The apparatus of claim 15, wherein the processor is further configured to:
receive other estimated numbers of sidelink devices from other sidelink devices within at least one of source transmit signals or destination receive signals; and
update the current estimated number of active sidelink devices based on the other estimated numbers of sidelink devices.

22. The apparatus of claim 15, wherein the processor is further configured to:
select the back-off value such that a minimum back-off value of a set of back-off values utilized by the current estimated number of active sidelink devices is equal to an average back-off value utilized by non-sidelink devices that are actively accessing the sidelink channel.

23. An apparatus for sidelink wireless communication, the apparatus comprising:
means for listening to a sidelink channel comprising unlicensed spectrum;
means for estimating a number of sidelink devices that are actively accessing the sidelink channel within a given period of time to determine a current estimated number of active sidelink devices, wherein the means for estimating the number of sidelink devices comprises:
means for monitoring distributed handshake signaling between the sidelink devices to generate a list of active sidelink devices; and
means for determining the current estimated number of active sidelink devices using the list of active sidelink devices;
means for estimating a number of non-sidelink devices that are actively accessing the sidelink channel within the given period of time to determine a current estimated number of active non-sidelink devices, wherein a first communication protocol is utilized for communication between the sidelink devices over the sidelink channel and a second communication protocol different than the first communication protocol is utilized for communication between the non-sidelink devices over the sidelink channel;
means for selecting a back-off value for a back-off timer based on at least the current estimated number of active sidelink devices and the current estimated number of active non-sidelink devices when the sidelink channel is idle;
means for initializing the back-off timer with the back-off value; and
upon expiration of the back-off timer, means for performing an access attempt of the sidelink channel by transmitting a joint access synchronization (JAS) signal comprising a duration of time that the sidelink channel may be accessed by the sidelink devices.

24. The apparatus of claim 23, further comprising:
means for transmitting sidelink device information indicating the current estimated number of active sidelink devices within at least one of a source transmit signal or a destination receive signal, wherein the means for estimating the number of sidelink devices further comprises:
 means for receiving other estimated numbers of sidelink devices from other sidelink devices within at least one of source transmit signals or destination receive signals; and
 means for updating the current estimated number of active sidelink devices based on the other estimated numbers of sidelink devices.

* * * * *